(12) United States Patent
Okubo

(10) Patent No.: US 6,508,708 B1
(45) Date of Patent: Jan. 21, 2003

(54) METHOD FOR PROCESSING OBJECT MOVEMENTS, GAME MACHINE USING SAID METHOD, AND RECORDING MEDIUM ON WHICH A RELATED PROGRAM IS RECORDED

(75) Inventor: Shinju Okubo, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/559,127

(22) Filed: Apr. 28, 2000

(30) Foreign Application Priority Data

Apr. 25, 2000 (JP) ........................................ 2000-123955

(51) Int. Cl.[7] ................................................ A63F 13/00
(52) U.S. Cl. ............................. 463/32; 463/31; 463/43
(58) Field of Search ............................. 463/30, 31, 32, 463/33, 43

(56) References Cited

U.S. PATENT DOCUMENTS 6,066,046 A * 5/2000 Yamamoto ...................... 463/7
6,217,444 B1 * 4/2001 Kataoka et al. ................. 463/3

FOREIGN PATENT DOCUMENTS

JP 10-31410 2/1998
JP 10-31410 A * 2/1998 ............ G09B/9/00

OTHER PUBLICATIONS

English Language Abstract of JP 10–31410.

* cited by examiner

*Primary Examiner*—Michael O'Neill
*Assistant Examiner*—Julie Brocketti
(74) *Attorney, Agent, or Firm*—Greenblum & Bernstein, P.L.C.

(57) ABSTRACT

First, a process of moving an object such as a train is executed. Then, the influential ranges of virtual winds that are correlated with the object in advance are moved with a movement of the object. Based on the moved influential ranges of the virtual winds, it is judged whether each particle object is influenced by the virtual winds. The position of each particle object for which a judgment has been made that it is influenced by a virtual wind is determined in accordance with the direction of the influential virtual wind. Particle objects that have contacted the object are deleted. The object and the position-determined particle objects are drawn in a frame buffer. An image drawn in the frame buffer is displayed on a display screen.

24 Claims, 17 Drawing Sheets

FIG. 3

| WIND NUMBER | WIND REFERENCE POSITION | WIND DIRECTION | WIND POWER | WIND INFLUENTIAL RANGE |
|---|---|---|---|---|
| 1 | wind_pos1 | wind_dir1 | wind_pow1 | wind_dist1 |
| 2 | wind_pos2 | wind_dir2 | wind_pow2 | wind_dist2 |
| 3 | wind_pos3 | wind_dir3 | wind_pow3 | wind_dist3 |
| 4 | wind_pos4 | wind_dir4 | wind_pow4 | wind_dist4 |

FIG. 4

| 301 PARTICLE NUMBER | 303 POSITION | 305 DIRECTION | 307 FORCE | 309 WIND DIRECTION CHANGE START DIRECTION | 311 WIND DIRECTION CHANGE END DIRECTION | 313 RECEIVE WIND POWER | 315 MAXIMUM NUMBER OF INTERPOLATION FRAMES | 317 CURRENT FRAME NUMBER | 319 CURRENT WIND DIRECTION |
|---|---|---|---|---|---|---|---|---|---|
| 1 | pos1 | dir1 | pow1 | windnowdir1 | windnextdir1 | windpow1 | windanimfrmmax1 | windanimfrm1 | winddir1 |
| 2 | pos2 | dir2 | pow2 | windnowdir2 | windnextdir2 | windpow2 | windanimfrmmax2 | windanimfrm2 | winddir2 |
| 3 | pos3 | dir3 | pow3 | windnowdir3 | windnextdir3 | windpow3 | windanimfrmmax3 | windanimfrm3 | winddir3 |
| 4 | pos4 | dir4 | pow4 | windnowdir4 | windnextdir4 | windpow4 | windanimfrmmax4 | windanimfrm4 | winddir4 |
| ......... | ......... | ......... | ......... | ......... | ......... | ......... | ......... | ......... | ......... |

300

FIG. 18
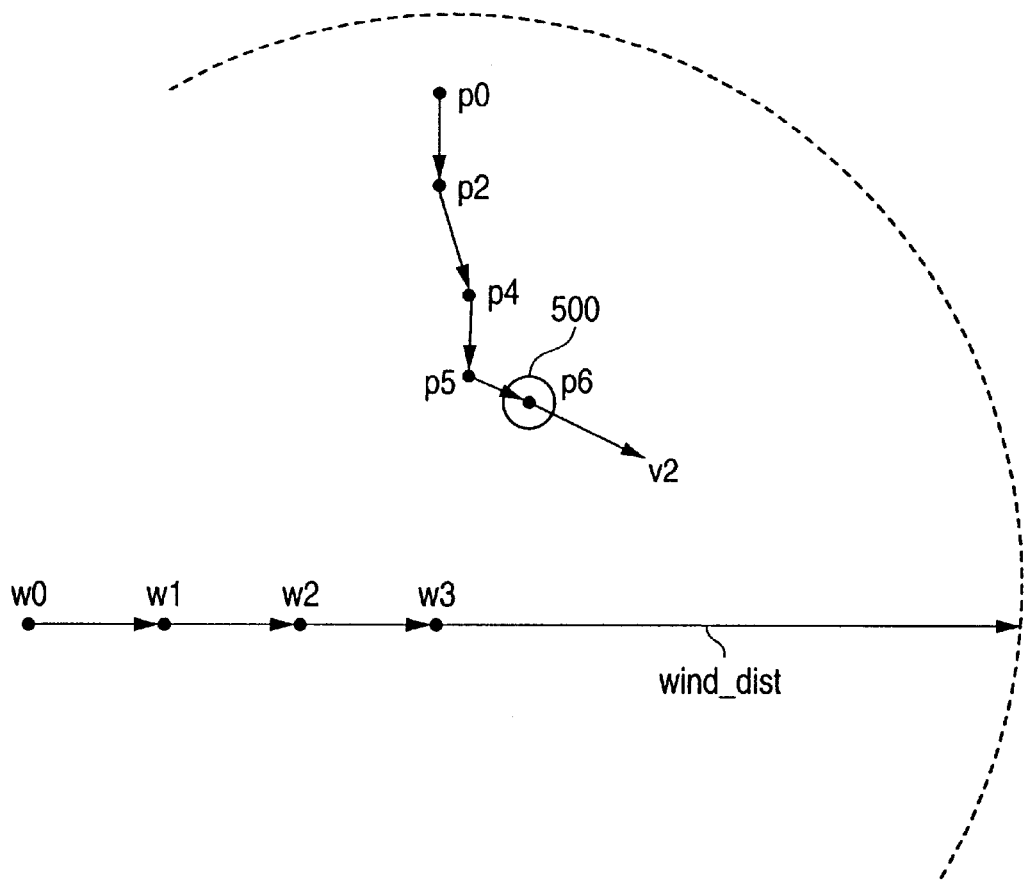
FIG. 19A
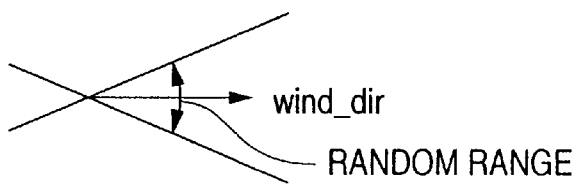
→ prtcl_windnowdir
FIG. 19B
→ wind_dir
— RANDOM RANGE
FIG. 19C
→ prtcl_windnextdir

METHOD FOR PROCESSING OBJECT MOVEMENTS, GAME MACHINE USING SAID METHOD, AND RECORDING MEDIUM ON WHICH A RELATED PROGRAM IS RECORDED

BACKGROUND OF THE INVENTION

1. Field of the Invention

The present invention relates to a technique that makes it possible to express the behavior of particle objects more realistically in a video game.

2. Description of the Related Art

In video games, it is desired to express the environment of a character in a virtual three-dimensional space so that it comes closer to a similar environment in the real world. For example, there is a case in which the environment of a character is expressed by displaying whirling snow on the screen. In this case, expressing whirling snow more realistically makes it possible to display a picture that causes a player to imagine cold winter.

In video games, various objects moving in a virtual three-dimensional space are displayed on the screen. An example of moving objects is a train object. When a train moves in the real world, winds occur around the train. If a train moves in falling snow, snow in the vicinity of the train is influenced by winds that are caused by the movement of the train and its falling directions etc. are changed. It is desired, also in video games, to control the falling directions etc. of snow in accordance with the movement of an object such as a train in a three-dimensional space.

For example, Japanese Unexamined Patent Publication No. Hei. 10-31410 discloses a technique of expressing snow that falls while fluttering by causing fall objects including a plurality of fall bodies as snow to fall with prescribed rotation directions and rotation speeds in an object space. This technique can further express a horizontal wind that varies with the position and time by varying the speeds, directions, and numbers of fall objects based on position and time information in an object space.

SUMMARY OF THE INVENTION

An object of the present invention is therefore to provide a technique that makes it possible to express the behavior of particle objects more realistically when influenced by winds caused by the movement of an object.

According to a first aspect of the invention, there is provided a computer-readable recording medium in which a game program for processing an object movement that is processed in a virtual three-dimensional space, the game program causing a computer to execute the steps of moving one or a plurality of regions having prescribed sizes on a screen according to a prescribed rule or a manipulation of a player; displaying one or a plurality of objects on the screen and judging a positional relationship between the object and the region having the prescribed size; determining a condition of movement on the screen of the object in accordance with a variation in the positional relationship between the object and the region having the prescribed size; and moving the object on the screen in accordance with the determined movement conditions.

According to a second aspect of the invention, there is provided a method for processing an object movement that is processed in a virtual three-dimensional space, comprising the steps of moving one or a plurality of regions having prescribed sizes on a screen according to a prescribed rule or a manipulation of a player; displaying one or a plurality of objects on the screen and judging a positional relationship between the object and the region having the prescribed size; determining a condition on movement on the screen of the object in accordance with a variation in the positional relationship between the object and the region having the prescribed size; and moving the object on the screen in accordance with the determined movement condition.

According to a third aspect of the invention, there is provided a game machine which controls, on a display screen, an object movement that is processed in a virtual three-dimensional space, comprising a unit for running a game according to a program; a memory for storing all or part of the program; the display screen on which to display the game that is run by the unit, wherein the unit executes, according to the program stored in the memory, the steps of moving one or a plurality of regions having prescribed sizes on the display screen according to a prescribed rule or a manipulation of a player; displaying one or a plurality of objects on the display screen and judging a positional relationship between the object and the region having the prescribed size; determining a condition of movement on the display screen of the object in accordance with a variation in the positional relationship between the object and the region having the prescribed size; and moving the object on the display screen in accordance with the determined movement condition.

BRIEF DESCRIPTION OF THE DRAWINGS

FIG. 3 shows an example of a wind data table;

FIG. 4 shows an example of a particle data table;

FIGS. 15–18 are schematic diagrams following FIG. 13 and illustrating how the particle object moves in the case where one particle object and one virtual wind exist;

FIGS. 19A–19C are schematic diagrams illustrating a new interpolation start direction and a new interpolation end direction;

DETAILED DESCRIPTION OF THE PREFERRED EMBODIMENTS

Embodiment 1

Figure 1:
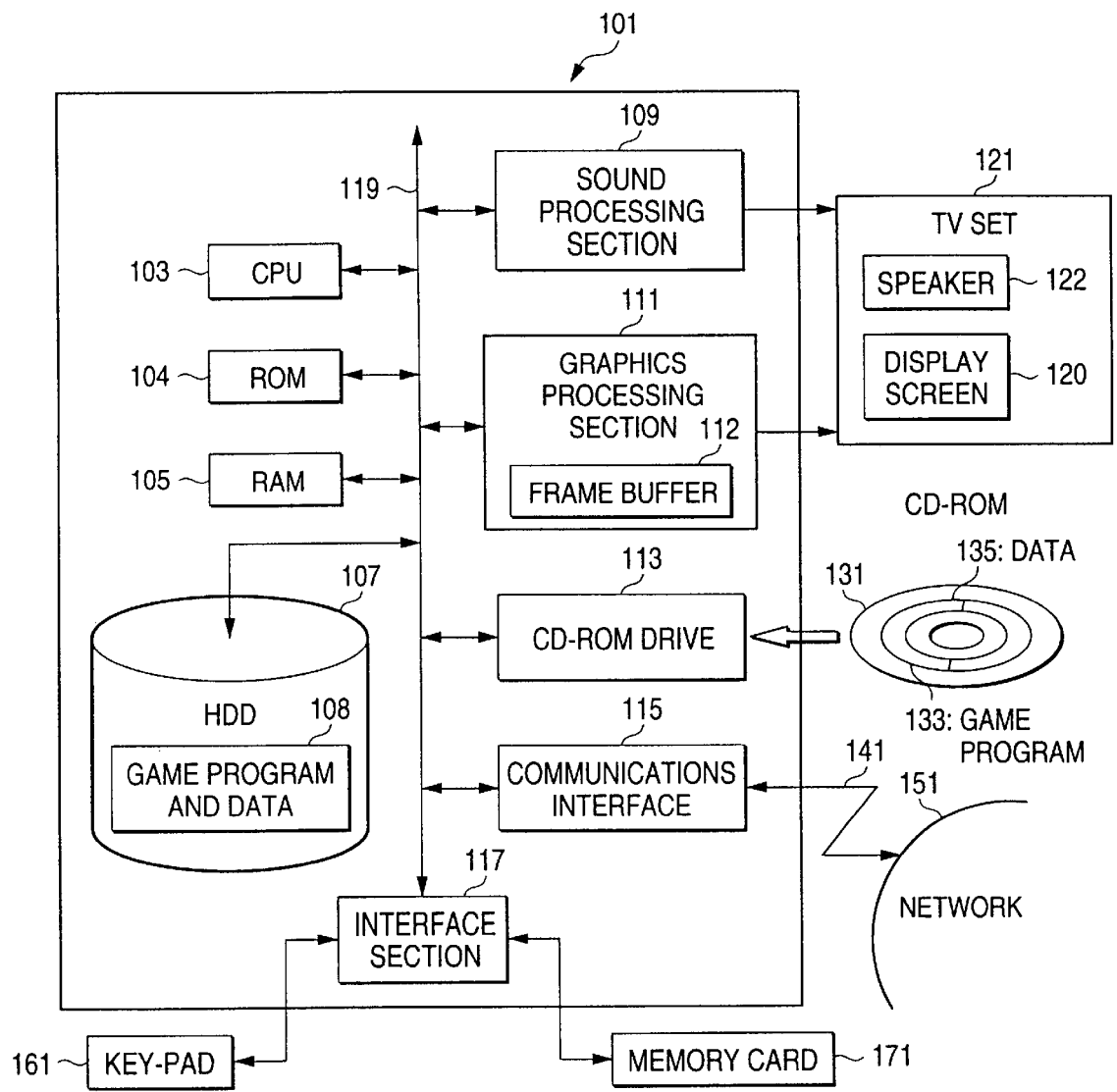
FIG. 1 is a block diagram showing the configuration of a home game machine.

FIG. 1 shows an example home game machine 101 that executes a computer program that is an implementation of a first embodiment of the invention. The home game machine 101 is equipped with a CPU (central processing unit) 103 connected to an internal bus 119, for example, a ROM (read-only memory) 104, a RAM (random access memory) 105, an HDD (hard disk drive) 107, a sound processing section 109, a graphics processing section 111, a CD-ROM drive 113, a communications interface 115, and an interface section 117. The graphics processing section 111 has a frame buffer 112. The frame buffer 112 may also be referred to as a VRAM (video RAM).

The sound processing section 109 and the graphics processing section 111 of the home game machine 101 are connected to a TV set 121 having a display screen 120 and a speaker 122. A removable CD-ROM 131 is mounted in the CD-ROM drive 113. A game program 133 and data 135 according to the embodiment are recorded on the CD-ROM 131. The communications interface 115 is connected to a network 151 via a communications medium 141. A key-pad 161 having manipulation buttons and a memory card 171 are connected to the interface section 117.

The CPU 103 executes a program stored in the ROM 104 and the game program 133 recorded on the CD-ROM 131 and controls the home game machine 101. The RAM 105 provides a work area of the CPU 103. The HDD 107 provides a storage area for storing, for example, the game program 133 and the data 135 recorded on the CD-ROM 131. The memory card 171 provides a storage area for storing data to be referred to by the game program 133. When a program being executed by the CPU 103 makes an instruction to produce a sound output, the sound processing section 109 interprets the instruction and outputs a sound signal to the TV set 121. The sound signal is output from the speaker 122 of the TV set in the form of a sound.

The graphics processing section 111 generates image data according to drawing instructions that are output from the CPU 103 and writes the generated image data in the frame buffer 112. The graphics processing section 111 outputs, to the TV set 121, a signal for display of the written image data on the display screen 120. The CD-ROM drive 113 reads out the game program 133 and the data 135 from the CD-ROM 131. The communications interface 115, which is connected to the network 151 via the communications medium 141, performs an input/output control on a data communication to be performed with another computer or the like. The interface section 117 receives an input from the key-pad 161 and outputs it to the RAM 105. The CPU 103 interprets the input from the key-pad 161 and performs necessary computation.

The game program 133 and the data 135 according to this embodiment are originally recorded on the CD-ROM 131, for example. When the game program 133 needs to be executed, the game program 133 and the data 135 are read out by the CD-ROM drive 113 and loaded into the RAM 105. Alternatively, the game program 133 and the data 135 may be read out from the CD-ROM 131 by the CD-ROM drive 113 and stored in the HDD 107 in advance. Where the game program and data 108 according to this embodiment are stored in the HDD 107, they are loaded into the RAM 105 from the HDD 107.

The CPU 103 processes the game program 133 and the data 135 according to the embodiment that have been loaded into the RAM 105 and outputs drawing instructions to the graphics processing section 111. Intermediate data are stored in the RAM 105. The graphics processing section 111 operates according to drawing instructions supplied from the CPU 103, write image data to the frame buffer 112, and outputs a signal for display of the image data on the display screen 120 to the TV set 121.

The algorithm of the game program 133 according to this embodiment to be executed by the above home game machine 101 and the data 135 to be used during execution of the game program 133 will be described below in detail.

The data 135 that are used in this embodiment will be described below with reference to FIGS. 2–4.

Figure 2:
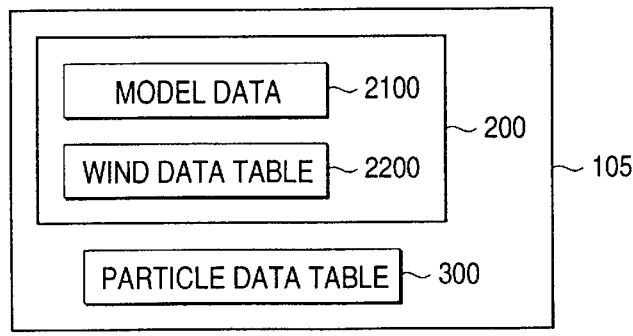
FIG. 2 is a schematic diagram showing a state of a RAM during execution of a game program according to a first embodiment of the present invention.

FIG. 2 is a schematic diagram showing a state of the RAM 105 that is executing the game program 133 according to this embodiment. The RAM 105 stores object data 200 of a moving character and a particle data table 300 relating to particle objects. The object data 200 of a moving character include model data 2100 relating to polygons etc. of the object and a wind data table 2200 relating to virtual winds that are correlated with the object concerned.

FIG. 3 shows an example of the wind data table 2200. The wind data table 2200 is provided for each correlated object. For example, a plurality of virtual winds are set for each object. In the example of FIG. 3, four virtual winds are set and given respective numbers that are stored in a wind number column 2201. A wind reference position, a wind direction, wind power, and a wind influential range are defined for a virtual wind. Therefore, the wind data table 2200 is provided with a wind reference position column 2203, a wind direction column 2205, a wind power column 2207, and a wind influential range column 2209.

Relative positional coordinates with reference to the reference position of the correlated object are stored in the wind reference position column 2201. A unit vector representing a wind direction is stored in the wind direction column 2205. A scalar value representing wind power is stored in the wind power column 2207. The radius of a spherical wind influential range is stored in the wind influential range column 2209.

In FIG. 3, a wind reference position "wind_pos1," a wind direction "wind_dir1," wind power "wind_pow1," and a wind influential range "wind_dist1" are defined for a virtual wind of wind number-1. A wind reference position "wind_pos2," a wind direction "wind_dir2," wind power "wind_pow2," and a wind influential range "wind_dist2" are defined for a virtual wind of wind number-2. A wind reference position "wind_pos3," a wind direction "wind_dir3, " wind power "wind_pow3," and a wind influential range "wind_dist3" are defined for a virtual wind of wind number-3. A wind reference position "wind_pos4," a wind direction "wind_dir4" wind power "wind_pow4," and a wind influential range "wind_dist4" are defined for a virtual wind of wind number-4.

A single virtual wind, rather than a plurality of virtual winds, may be correlated with an object.

FIG. 4 shows an example of the particle data table 300. A particle number is given to each particle object and stored in a particle number column 301. Current positional coordinates (prtcl_pos) of each particle object are stored in a position column 303. A unit vector representing a default movement direction (prtcl_dir) of each particle object is stored in a direction column 305. A scalar value representing a default movement distance (prtcl_pow) of each particle object is stored in a force column 307. A unit vector representing an interpolation start direction (prtcl_windnowdir) that is used in changing the wind direction by interpolation to determine a movement direction of each particle object is stored in a wind direction change start direction column 309. The initial value of the interpolation start direction is a default movement direction of each particle object. A unit vector representing an interpolation end direction (prtcl_windnextdir) that is used in changing the wind direction by interpolation to determine a movement direction of each particle object is stored in a wind direction change end direction column 311.

A scalar value representing wind power (prtcl_windpow) that each particle object receives from a virtual wind is stored in a received wind power column 313. A maximum number (prtcl_windanimfrmmax) of interpolation frames that are used in interpolation processing for changing the wind direction for each particle object is stored in a maximum-number-of-interpolation-frames column 315. The initial value of the maximum number of interpolation frames is a random integer selected from 16–32, for example. A current frame number (prtcl_windanimfrm) that is used in interpolation processing for changing the wind direction for each particle object is stored in a current frame number column 317. The initial value of the current frame number is 0. A current wind direction (prtcl_winddir) of a virtual wind that each particle object is receiving currently is stored in a current wind direction column 319.

As shown in FIG. 4, a particle object of particle number-1 has a position "pos1," a movement direction "dir1," and a movement distance "pow1." The particle object of particle number-1 has an interpolation start direction "windnowdir1," an interpolation end direction "windnextdir1," and received wind power "windpow1." Further, the particle object of particle number-1 has a maximum number "windanimfrmmax1" of interpolation frames, a current frame number "windanimfrm1," and a current wind direction "winddir1."

A particle object of particle number-2 has a position "pos2," a movement direction "dir2," and a movement distance "pow2." The particle object of particle number-2 has an interpolation start direction "windnowdir2," an interpolation end direction "windnextdir2," and received wind power "windpow2." Further, the particle object of particle number-2 has a maximum number "windanimfrmmax2" of interpolation frames, a current frame number "windanimfrm2," and a current wind direction "winddir2."

A particle object of particle number-3 has a position "pos3," a movement direction "dir3," and a movement distance "pow3." The particle object of particle number-3 has an interpolation start direction "windnowdir3," an interpolation end direction "windnextdir3," and received wind power "windpow3." Further, the particle object of particle number-3 has a maximum number "windanimfrmmax3" of interpolation frames, a current frame number "windanimfrm3," and a current wind direction "winddir3."

A particle object of particle number-4 has a position "pos4," a movement direction "dir4," and a movement distance "pow4." The particle object of particle number-4 has an interpolation start direction "windnowdir4," an interpolation end direction "windnextdir4," and received wind power "windpow4." Further, the particle object of particle number-4 has a maximum number "windanimfrmmax4" of interpolation frames, a current frame number "windanimfrm4," and a current wind direction "winddir4."

The number of particle objects may not be fixed in advance. As described later, for example, particle objects may disappear when contacting an object and may be generated randomly by a program. When a particle object disappears, its data are deleted from the particle data table 300. When a new particle object is generated, its data are registered in the particle data table 300.

The game program 133 according to this embodiment is also stored in the RAM 105.

Figure 5:
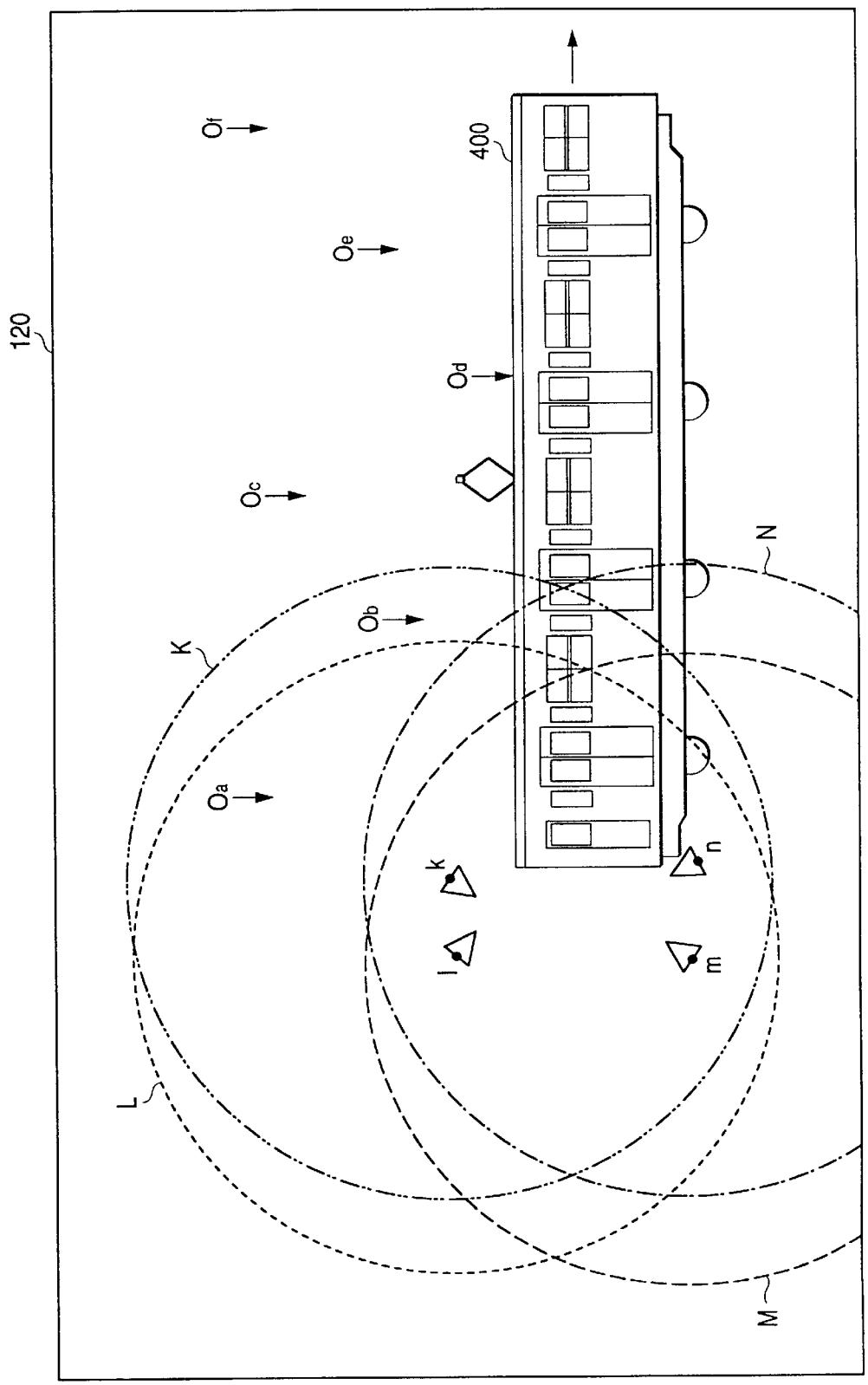
FIGS. 5–7 are schematic diagrams illustrating the principle of the first embodiment.
Figure 6:
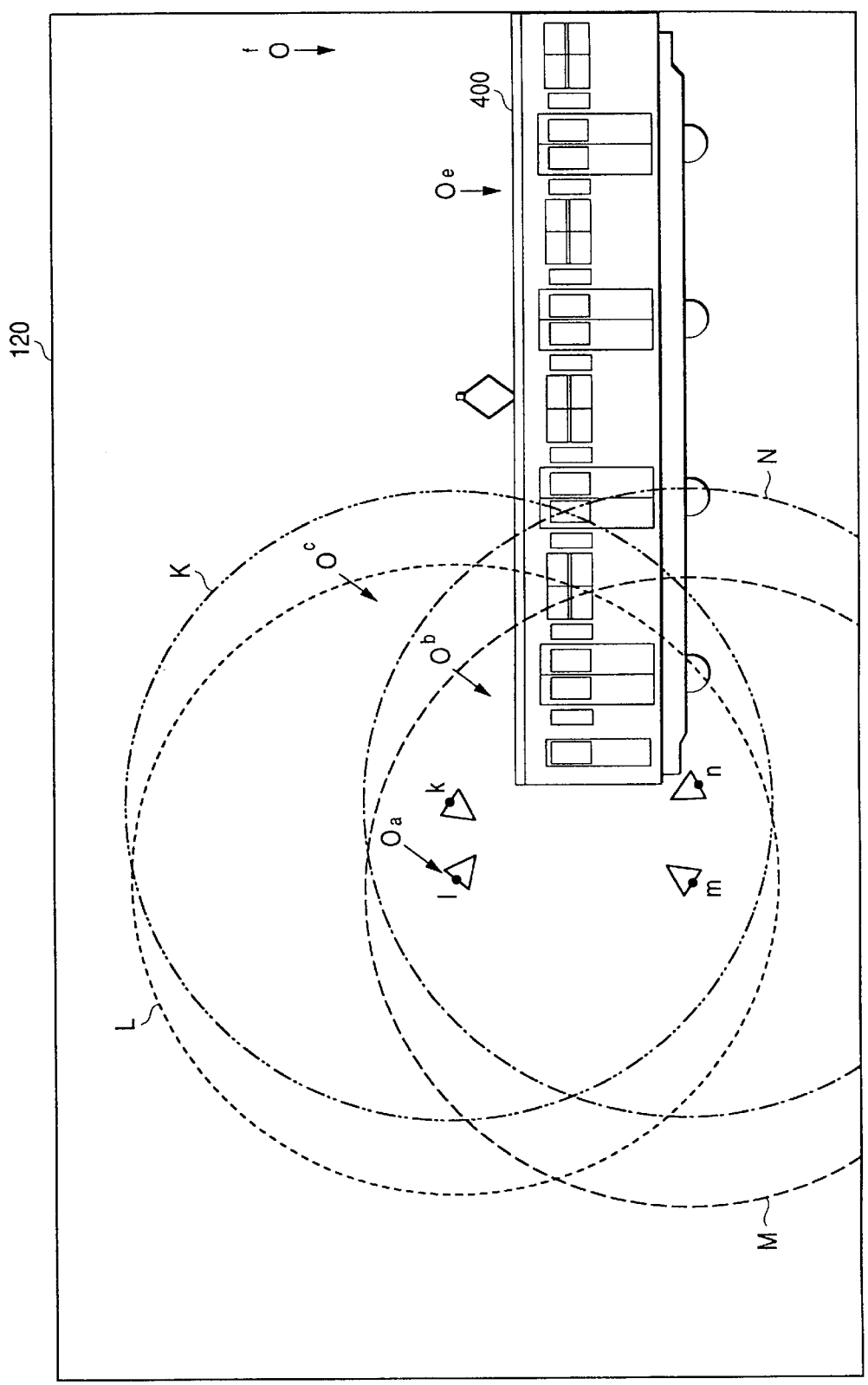
Figure 7:
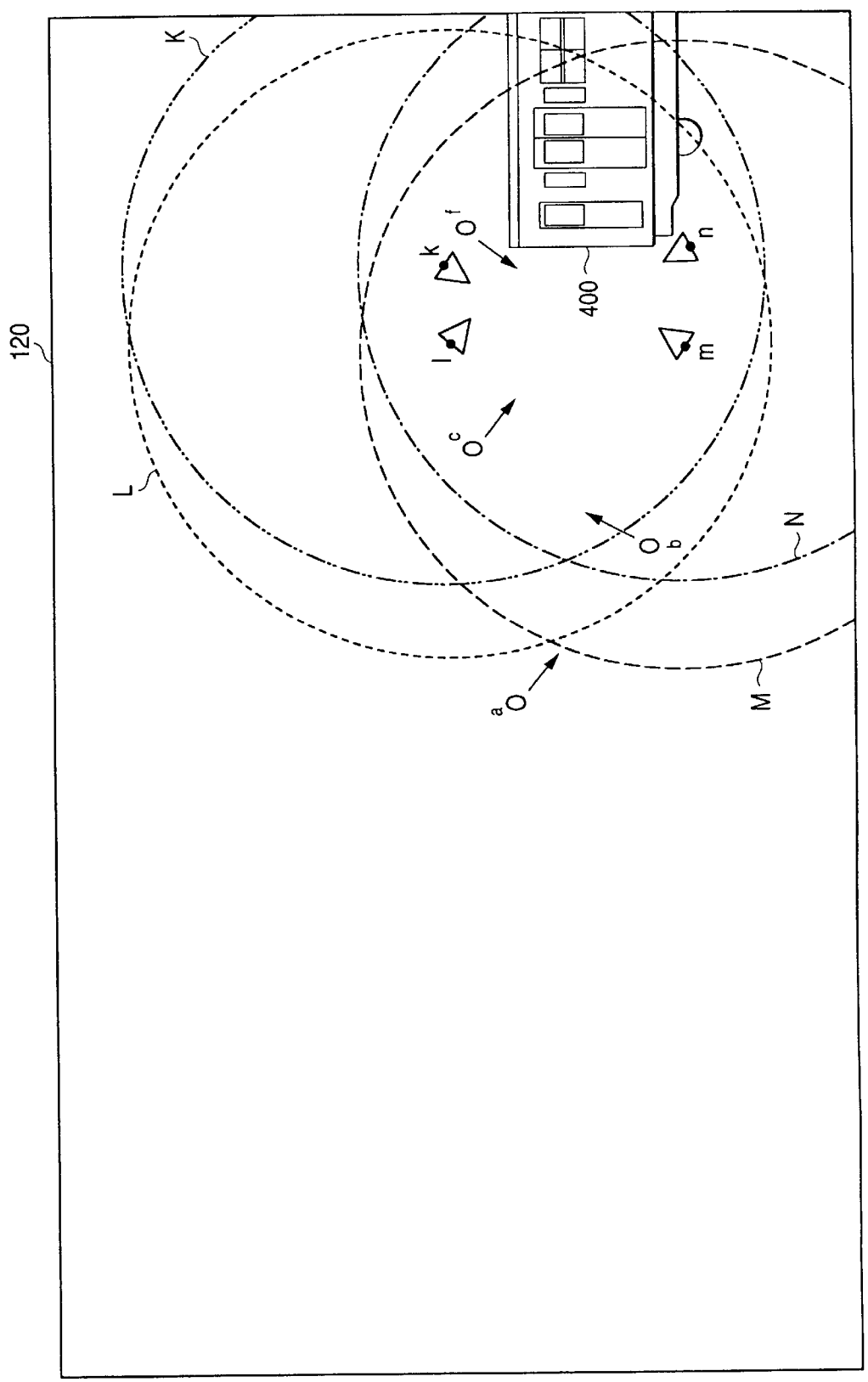

Next, the outline of this embodiment will be described with reference to FIGS. 5–7. FIGS. 5–7 show a scene that an object 400 that is a train moves rightward from the center in a display screen 120. The object 400 is moved according to computation of the processor 103 or manipulations of a player that are input through the key-pad 161. Four virtual winds k, l, m, and n are correlated with the object 400. The sources of the virtual winds are located in the rear of the object 400 (i.e., in the left part of the display screen 120). The influential range of the virtual wind k is range K that is indicated by a two-dot chain line. The influential range of the virtual wind l is range L that is indicated by a dense broken line. The influential range of the virtual wind m is range M that is indicated by a sparse broken line. The influential range of the virtual wind n is range N that is indicated by a chain line. Triangles located at the centers of the virtual winds show wind directions, respectively.

In FIG. 5, particle objects a–f representing snow are generated above the object 400 and move in a default direction with a default movement distance. The default direction and the default movement distance are represented by arrows that are shown under the respective particle objects. However, the particle object a has already entered the influential ranges K and L of the virtual winds k and l. The virtual wind k is closest to the particle object a. The particle object b has already entered the influential range K of the virtual wind k. Since the particle object d will soon contact the object 400, it will disappear in the next frame.

FIG. 6 shows a state that is several frames after the state of FIG. 5. A front portion of the object 400 (train) is out of the display screen 120. The virtual winds k, l, m, and n move as the object 400 moves. The relative positional relationships between the object 400 and the virtual winds k, l, m, and n do not vary.

In FIG. 6, although the particle object a is located in the influential ranges of all the virtual winds, it is moving in accordance with the direction of the virtual wind k that first influenced the particle object a. Although the particle object b is located in the influential ranges K, L, and N of the virtual winds k, l, and n, it is moving in accordance with the direction of the virtual wind k that first influenced the particle object b. The particle object c is located in the influential range K of the virtual wind k and is moving in accordance with the direction of the virtual wind k. The movement direction of a particle object will be described later in detail with reference to a process flow of the program according to this embodiment. The particle objects e and f are moving in the default direction with the default movement distance.

FIG. 7 shows a state that is several frames after the state of FIG. 6. The object 400 (train) is out of the display screen 120 except its rear end portion. The virtual winds k, l, m, and n move as the object 400 moves. The relative positional relationships between the object 400 and the virtual winds k, l, m, and n do not vary.

In FIG. 7, the particle object a has already gone out of the influential ranges of all the virtual winds. However, the particle object a is moving in accordance with the direction of the virtual wind l that influenced the particle object last. The particle object b is located in the influential ranges L, M, and N of the virtual winds l, m, and n, and it still has an influence of the virtual wind m and is moving in the direction in accordance with the direction of the virtual wind m. Although the particle object c is located in the influential ranges of all the virtual winds, it is moving in the direction in accordance with the direction of the closest virtual wind l. The particle object e has contacted the object 400 and hence has already disappeared before the state of FIG. 7. Although the particle object f is located in the influential ranges of all the virtual winds, it is moving in the direction in accordance with the direction of the direction of the virtual wind k that first influenced the particle object k.

As described above with reference to FIGS. 5–7, in this embodiment the influential ranges of virtual winds move as an object moves. And a partial object moves in a direction in accordance with the direction of an influential virtual wind.

Based on the above assumptions, a process flow according to this embodiment will be described.

Upon activation, based on the operating system stored in the ROM 104 or the like, the CPU 103 reads out the game program 133 and the data 135 that are necessary for image processing and execution of the game from the CD-ROM 131 via the CD-ROM drive 113 and transfers those to the RAM 105. The CPU 103 realizes the following process by executing the game program 133 that has been transferred to the RAM 105.

Controls and operations that are performed in the home game machine 101 include ones that are actually performed cooperatively by the CPU 103 and other circuits. For convenience of description, controls and operations involving the CPU 103 will be described as if they were directly performed by the CPU 103.

Actually, the game program 133 and the data 135 that are necessary for image processing and execution of the game are sequentially read out from the CD-ROM 131 and transferred to the RAM 105 according to instructions from the CPU 103 and the progress of the process. However, in the following description, to facilitate understanding of the invention, descriptions relating to readout of the data 135 from the CD-ROM 131 and their transfer to the RAM 105 will be omitted.

Where the game program 133 and the data 135 that are necessary for image processing and execution of the game are stored in the HDD 107, they are sequentially read out from the HDD 107 and transferred to the RAM 105 according to instructions from the CPU 103 and the progress of the process. However, in the following description, for the same reason as mentioned above, descriptions relating to readout of the data 135 from the HDD 107 and their transfer to the RAM 105 will be omitted.

Figure 8:
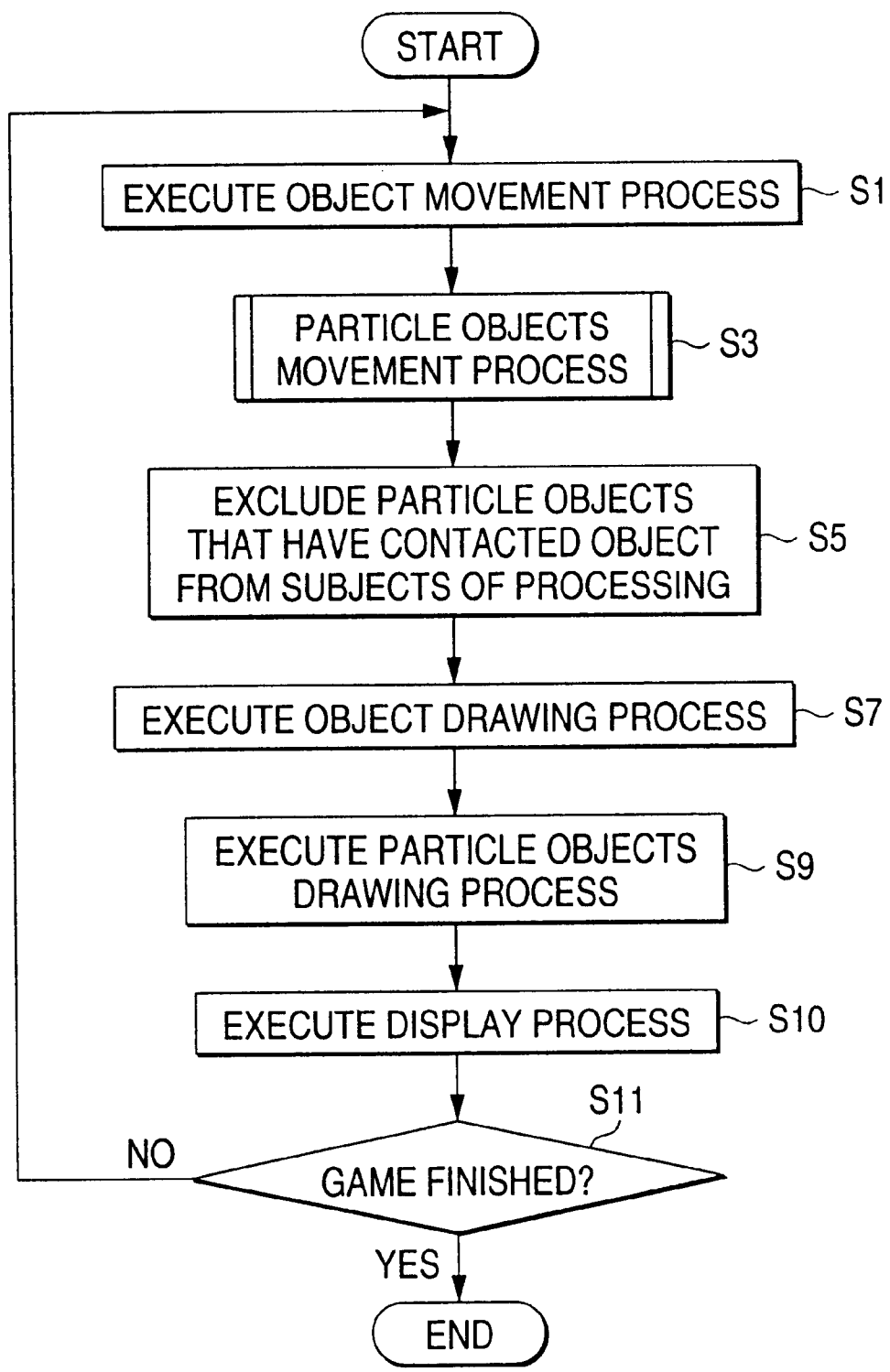
FIG. 8 is a flowchart showing the main flow of a process according to the first embodiment.

FIG. 8 shows the main flow of a process of displaying an object and particle objects. First, an object movement process is executed at step S1. For example, a movement distance of the object is calculated according to manipulations on the key-pad 161 or instructions from the program and a position of the object is determined. At step S3, a particle objects movement process is executed, which will be described later in detail.

At step S5, a process of excluding particle objects that have contacted the object from the subjects of processing is executed. For example, whether a particle object has contacted the object is judged in the following manner.

Figure 9:
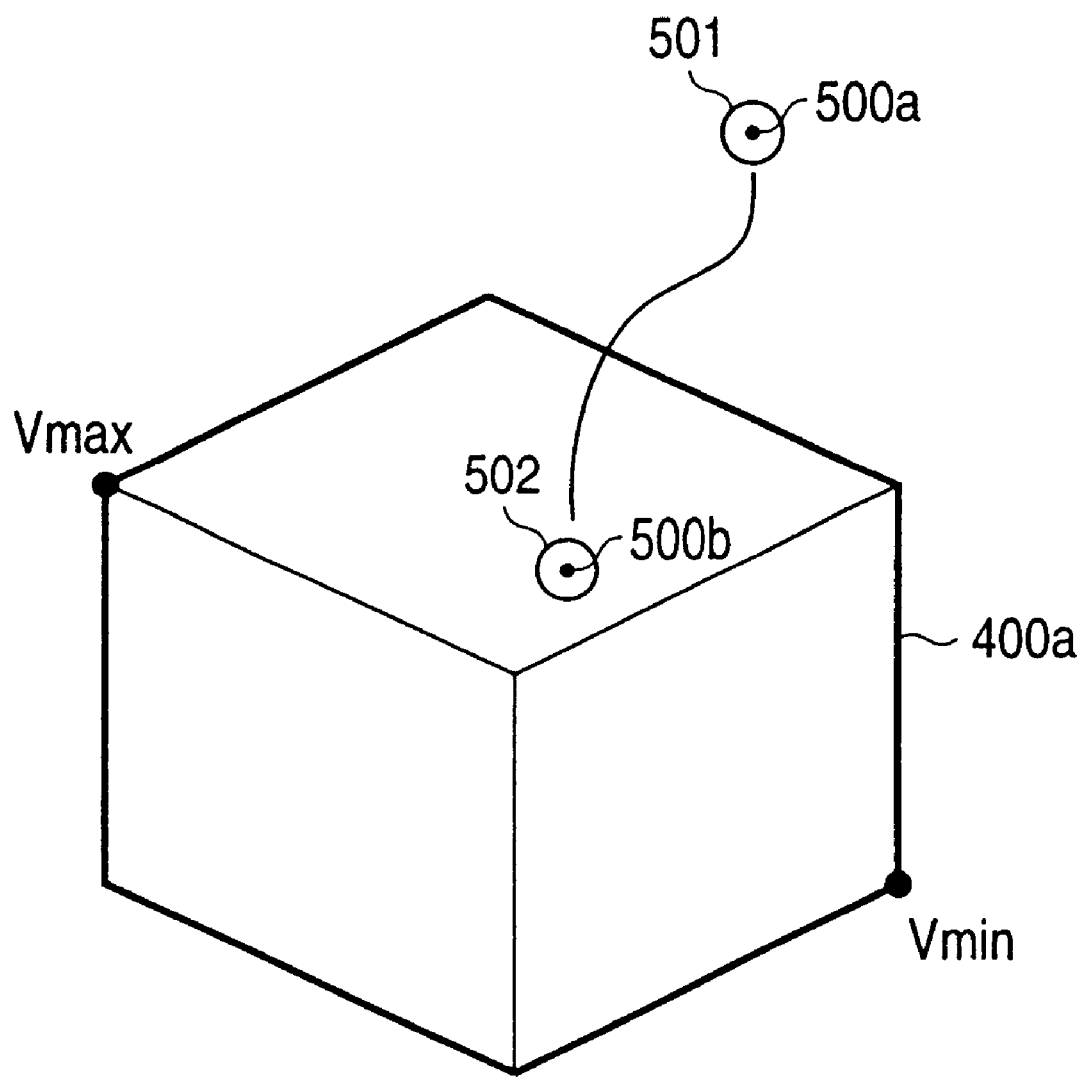
FIG. 9 is a schematic diagram illustrating a process of judging whether a particle object has contacted an object.

For example, assume a case of FIG. 9 in which it should be judged whether a particle object 501 (i.e., a particle object before a movement) has contacted the object 400 (see FIG. 5) when the particle object 501 has moved from a position 500*a* to a position 500*b*. In this case, a rectangular parallelepiped object 400*a* including the object 400 is assumed. The smallest x-coordinate value Vxmin and the largest x-coordinate value Vxmax are found in the object 400*a*, and it is judged whether the x-coordinate of the position 500*b* of a particle object 502 (i.e., a particle object after the movement) is between Vxmin and Vxmax. If the x-coordinate of the position 500*b* of the particle object 502 is between Vxmin and Vxmax, the smallest y-coordinate value Vymin and the largest y-coordinate value Vymax are found in the object 400*a*, and it is judged whether the y-coordinate of the position 500*b* of the particle object 502 is between Vymin and Vymax.

If the y-coordinate of the position 500*b* of the particle object 502 is between Vymin and Vymax, the smallest z-coordinate value Vzmin and the largest z-coordinate value Vzmax are found in the object 400*a*, and it is judged whether the z-coordinate of the position 500*b* of the particle object 502 is between Vzmin and Vzmax. If the z-coordinate of the position 500*b* of the particle object 502 is between Vzmin and Vzmax, it is judged that the particle object 502 has contacted the object 400*a*. If any of the above conditions is not satisfied, it is judged that the particle object 502 has not contacted the object 400*a*. In FIG. 9, point Vmin is a point having the smallest x, y, and z-coordinate values in the object 400*a* and point Vmax is a point having the largest x, y, and z-coordinate values in the object 400*a*. It is judged that a particle object that has contacted the object 400*a* has also contacted the object 400 (see FIG. 5).

If it is judged that a particle object has contacted the object, the particle object is removed from the subjects of processing and the data of the particle object are deleted from the particle data table 300.

Then, an object drawing process is executed at step S7. A light source calculation and transparent transformation are performed on the object and results are written to the frame buffer 112. The transparent transformation is to convert the coordinate values of the vertices of polygons in the world coordinate system to coordinate values in the screen coordinate system. An image produced by the transparent transformation is drawn in the frame buffer 112. The light source calculation is to calculate shades (lightness) that are produced by an imaginary light beam emitted from a light source.

A particle objects drawing process is executed at step S9. A light source calculation and transparent transformation are performed on particle objects and results are written to the frame buffer 112. The contents of the frame buffer 112 are displayed at step S10.

At step S11, it is judged whether the game should be finished. Whether to finish the game is judged based on, for example, whether the user has commanded the end of the game by manipulating the key-pad 161 or the game completion conditions in the story of the game have been satisfied. If the game should not be finished, the process is returned to step S1. If the game should be finished, the process is finished.

Next, the particle objects movement process will be described with reference to FIGS. 10–13. Since the object movement process has been executed at step S1 (see FIG. 8), at step S23 an object movement vector is acquired based on the object positions in the preceding frame and the current frame. At step S25, to move the positions of virtual winds, the object movement vector is added to the reference positions "wind_pos" of the virtual winds.

At step S27, the value of a counter s for particle objects is initialized to 1. At step S29, it is judged whether the value of the counter s has exceeded the number n of particle objects. If all the particle objects have been subjected to the process, the process is finished. On the other hand, if all particle objects have not been subjected to the process, at step S31 a default movement vector of the sth particle object is calculated according to prtcl_dir (default movement direction of the particle object)×prtcl_pow (default movement distance of the particle object).

At step S33, the movement vector is added to the position "prtcl_pos" of the particle object. Where gravity exists, at step S35 a gravity vector is added to the position "prtcl_pos" of the particle object. The process goes to the process part shown in FIG. 11 via terminal A.

Figure 11:
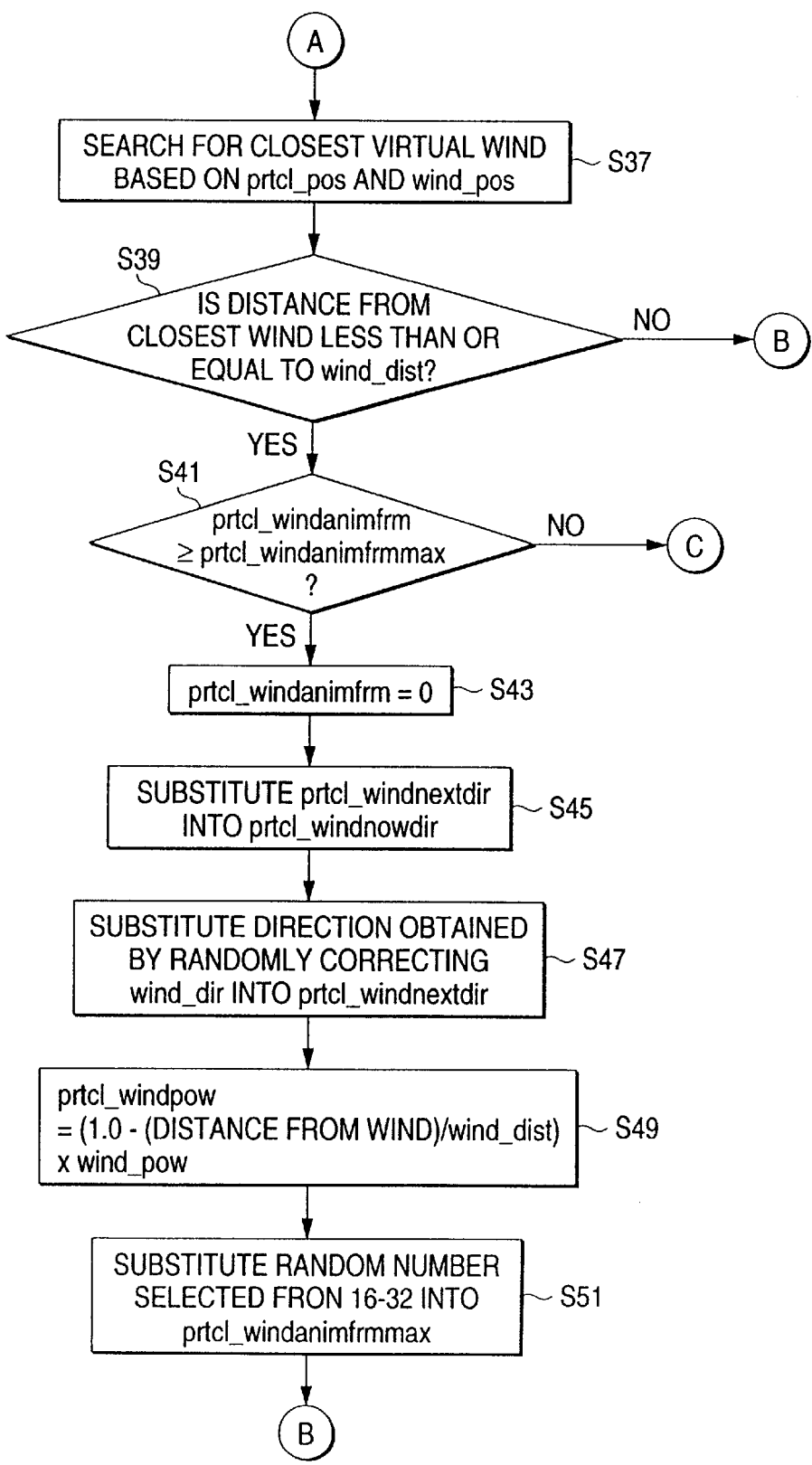
FIG. 11 is a flowchart showing a second part of the particle objects movement process according to the first embodiment.

In the process part of FIG. 11, first, at step S37, the closest virtual wind is searched for based on the position "prtcl_pos" of the particle object and the reference positions of the virtual winds. At step S37, for example, the distance between the position of the particle object and the reference position of each virtual wind is calculated in order and the smallest distance value and the number of a virtual wind having the smallest distance value are held. In this manner, the closest virtual wind can be found when step S73 has been executed for all the virtual winds.

At step S39, it is judged whether the distance from the closest virtual wind is less than or equal to its influential range "wind_dist," that is, whether the particle object being processed is included in the influential range of the closest virtual wind. If the particle object being processed is not included in the influential range of the closest virtual wind, a transition is made to the process part of FIG. 12 via terminal B. On the other hand, if the particle object being processed is included in the influential range of the closest wind, it is judged at step S41 whether the current frame number "prtcl_windanimfrm" is greater than or equal to the maximum number "prtcl_windanimfrmmax" of interpolation frames. If "prtcl_windanimfrm" is less than "prtcl_windanimfrmmax," a transition is made to the process part of FIG. 12 via terminal C. Where particle objects of snow are to be moved downward on the screen as in the example of FIG. 5, the particle object is not included in the influential ranges of the virtual winds immediately after it is generated at a top portion of the screen. Then, the particle object comes to enter the influential ranges of the virtual winds. In a frame where the particle object enters any of the influential ranges of the virtual winds, the current frame number "prtcl_windanimfrm" is less than the maximum number "prtcl_windanimfrmmax" of interpolation frames. Therefore, the process part of FIG. 12 will be described first.

Figure 12:
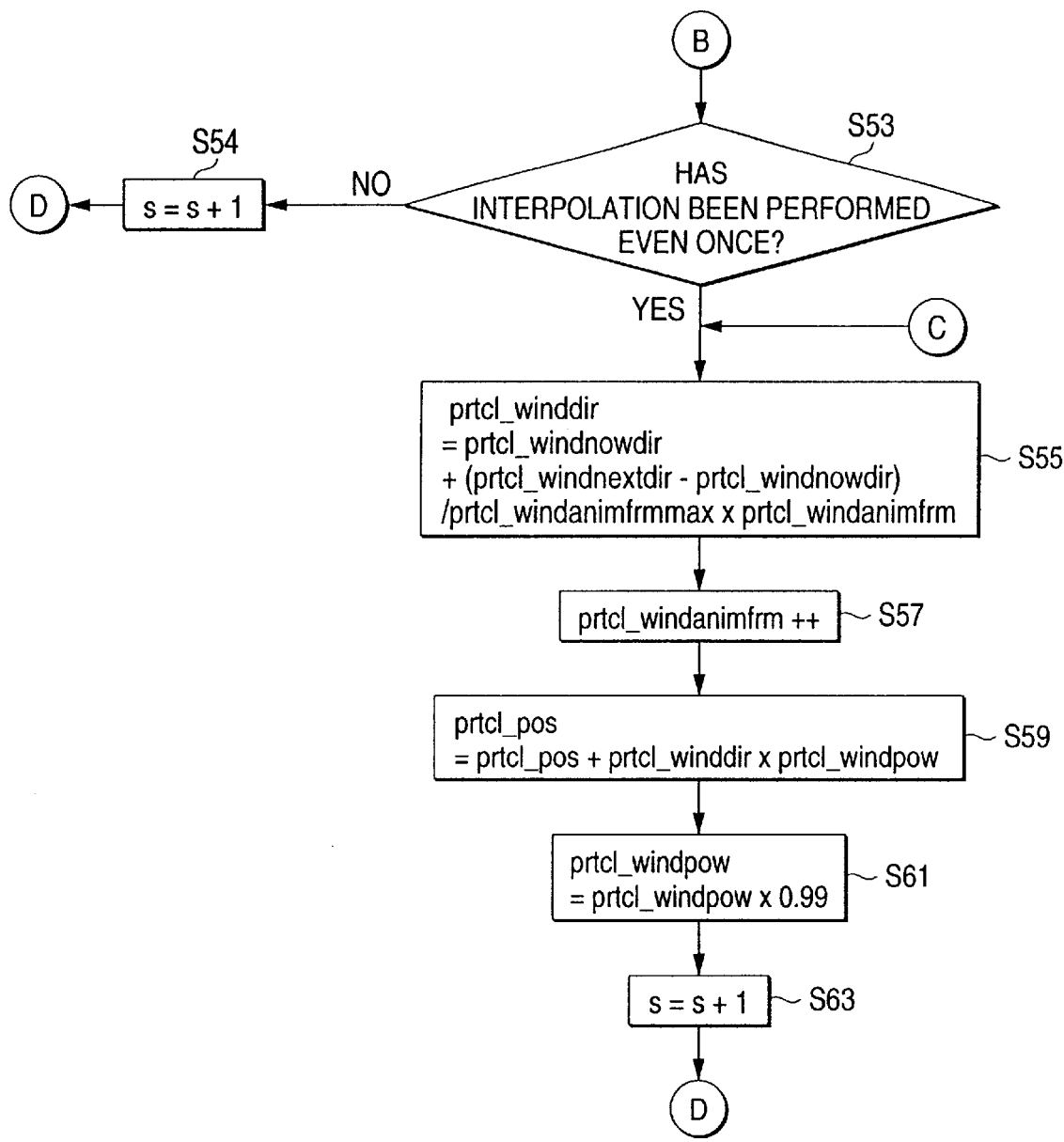
FIG. 12 is a flowchart showing a third part of the particle objects movement processes according to the first and second embodiments.

After the transition to the process part of FIG. 12 via terminal B, first, it is judged at step S53 whether steps S55–S63 have been executed even once. For example, if the particle object is not located in the influential range of the closest virtual wind in the first processing, step S55 (interpolation) should have not been executed even once. In such a case, at step S54 the value of the counter s for particle objects is incremented by 1 and the process returns to step S29 in FIG. 10 via terminal D.

On the other hand, if step S55 (interpolation) has been executed even once or if the current frame number "prtcl_windanimfrm" is less than the maximum number "prtcl_windanimfrmmax" of interpolation frames (transition via terminal C), at step S55 a current wind direction "prtcl_winddir" that influences the particle object concerned is calculated according to the following equation:

$$prtcl\_winddir = prtcl\_windnowdir + (prtcl\_windnextdir - prtcl\_windnowdir) / prtcl\_windanimfrmmax \times prtcl\_windanimfrm. \quad (1)$$

Equation (1) means that interpolation is performed from an interpolation start direction "prtcl_windnowdir" to an interpolation end direction "prtcl_windnextdir" over the maximum number "prtcl_windanimfrmmax" of interpolation frames. The initial value of "prtcl_windnowdir" is the default movement direction "prtcl_dir" of the particle object and the initial value of "prtcl_windnextdir" is the direction "wind_dir" of the influential virtual wind.

Then, at step S57, the current frame number "prtcl_windanimfrm" is incremented by 1. Step S57 may be executed anywhere between step S57 and step S63 as shown in FIG. 12; the execution order of the related steps may be changed. At step S59, the position "prtcl_pos" of the particle object is changed. The position "prtcl_pos" of the particle object is calculated according to the following equation:

$$prtcl\_pos = prtcl\_pos + prtcl\_winddir \times prtcl\_windpow. \quad (2)$$

The initial value of force "prtcl_windpow" that is received from the influential virtual wind is calculated according to the following equation:

$$prtcl\_windpow = (1.0 - (\text{distance from wind})/wind\_dist) \times wind\_pow \quad (3)$$

where the "distance from wind" means the distance between the position "prtcl_pos" of the sth particle object and the virtual wind closest to the sth particle object.

Equation (3) means that the force received from the influential virtual wind is decreased in proportion to the distance from the reference position of the virtual wind. That is, the force received from the influential virtual wind approaches the wind power of the virtual wind as the position of the particle object comes closer to the reference position of the virtual wind, and decreases as the former becomes more distant from the latter.

The force "prtcl_windpow" received from the influential virtual wind, which is used in calculating the position of the particle object, is weakened as the frame proceeds. That is, at step S61, "prtcl_windpow" is multiplied by 0.99 for the next calculation. However, 0.99 is just an example and another value smaller than 1 may be used.

At step S63, the value of the counter s for particle objects is incremented by 1 to make a transition to processing of another particle object. The process returns to step S29 in FIG. 10 via terminal D.

As described above, steps S55–S63 are repeatedly executed until for the same particle object it is judged at step S41 in FIG. 11 that prtcl_windanimfrm ≧ prtcl_windanimfrmmax is satisfied. If it is judged at step S41 that prtcl_windanimfrm ≧ prtcl_windanimfrmmax is satisfied, at step S43 the current frame number "prtcl_windanimfrm" is reset to 0. At step S45, the interpolation end direction "prtcl_windnextdir" so far used is substituted into the interpolation start direction "prtcl_windnowdir." At step S47, a direction obtained by randomly changing the direction "wind_dir" of the closest virtual wind into the interpolation end direction "prtcl_windnextdir."

At step S49, force "prtcl_windpow" received from the influential virtual wind is calculated again according to the above Equation (3). At step S51, a random integer selected from 16–32, for example, is substituted into the maximum number "prtcl_windanimfrmmax" of interpolation frames. Then, a transition is made to the process part of FIG. 12 via terminal B and the process part of FIG. 12 is executed under the new conditions that have been set at steps S43–S51.

Now, a simple example movement of a single particle object will be described with reference to FIGS. 13–19.

Figure 13:
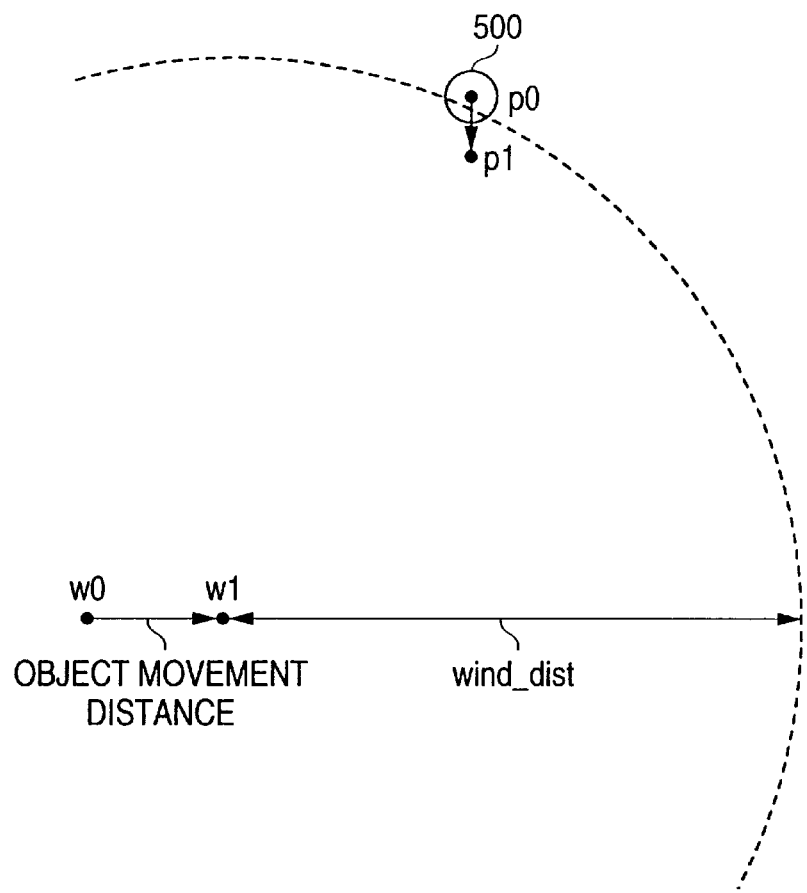
FIG. 13 is a schematic diagram illustrating how a particle object moves in a case where one particle object and one virtual wind exist.

FIG. 13 shows a case that one particle object 500 and one virtual wind exist. It is assumed that the reference position of the virtual wind has moved from w0 to w1 as the correlated object has moved. As indicated by a broken line in FIG. 13, the influential range of the virtual wind is a sphere having the new reference position w1 of the virtual wind as the center and a distance "wind_dist" as the radius.

Figure 10:
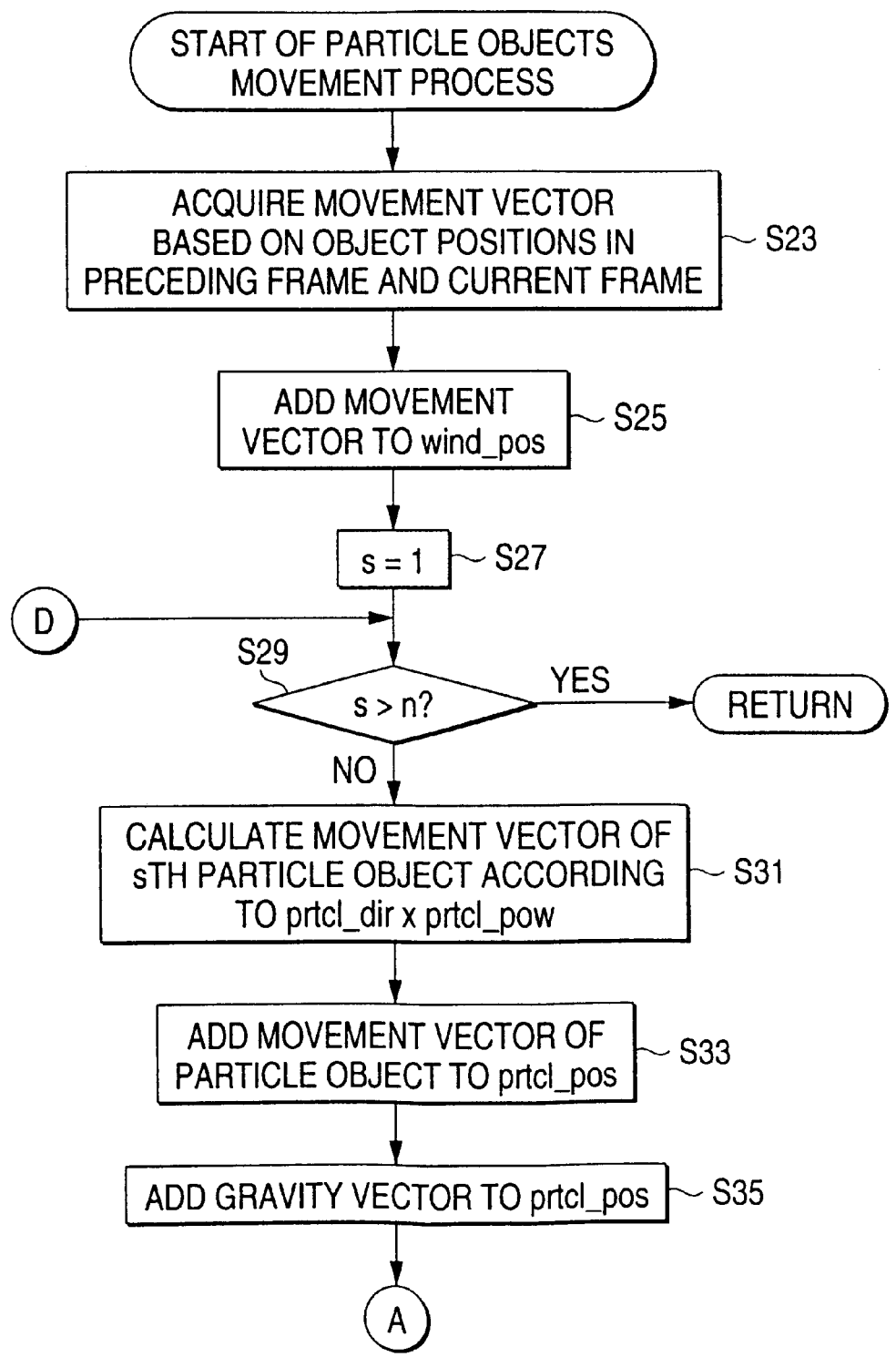
FIG. 10 is a flowchart showing a first part of particle objects movement process according to first and second embodiments of the invention.

First, at steps S31–S35 in FIG. 10, the default movement vector of the particle object 500 and the gravity vector are added to position p0 of the particle object 500, as a result of which the particle object 500 is moved to position p1.

At steps S37–S39 in FIG. 11, it is judged that position p1 of the particle object is in the influential range of the closest virtual wind. Since in FIG. 13 position p1 of the particle object 500 is in the broken-line influential range, it is judged that the particle object 500 is influenced by the virtual wind concerned. If it is assumed that the particle object 500 has first entered the influential range of the virtual wind, the current frame number "prtcl_windanimfrm" is 0 and the maximum number "prtcl_windanimfrmmax" of interpolation frames is a random integer selected from 16–32 in the above example. Therefore, at step S41 in FIG. 11 a transition is made to the process part of FIG. 12 via terminal C. To simplify the following description, it is assumed that the maximum number "prtcl_windanimfrmmax" of interpolation frames is 3.

Figure 14:
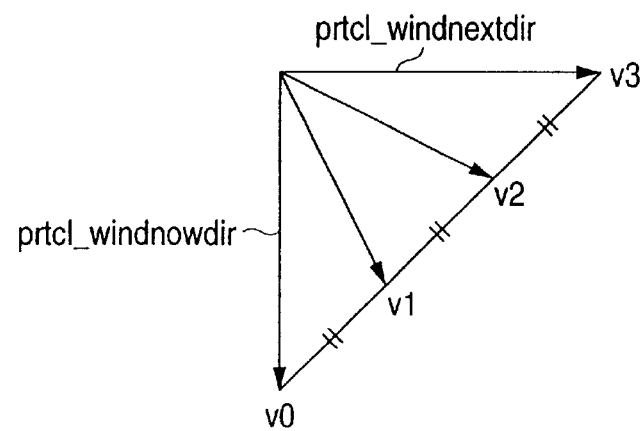
FIG. 14 is a schematic diagram illustrating interpolation between an interpolation start direction "prtcl_windnowdir" and an interpolation end direction "prtcl_windnextdir"

After the transition to the process part of FIG. 12 via terminal C, at step S55 the direction "prtcl_winddir" of the currently influenced virtual wind is determined. Where as shown in FIG. 14 the interpolation end direction "prtcl_windnextdir" is set in the horizontal direction and the interpolation start direction "prtcl_windnowdir" is set in the vertical direction, the start points of the interpolation end direction "prtcl_windnextdir" and the interpolation start direction "prtcl_windnowdir" are made the same point and a line segment connecting the end points of the interpolation end direction "prtcl_windnextdir" and the interpolation start direction "prtcl_windnowdir" is calculated. Then, vectors v1 and v2 are determined that have, as the respective end points, points obtained by dividing the calculated line segment into three equal parts (the number three is the maximum number "prtcl_windanimfrmmax" of interpolation frames) and that have the common start point of the interpolation start direction "prtcl_windnowdir" and the interpolation end direction "prtcl_windnextdir" as the common start point. In the first display frame, the direction "prtcl_winddir" of the currently influenced virtual wind is made vector v0 (=prtcl_windnowdir). In the second frame, "prtcl_winddir" is made vector v1. In the third frame, "prtcl_winddir" is made vector v2. Vectors v1 and v2 are not unit vectors in this example; they may be converted to unit vectors.

Figure 15:
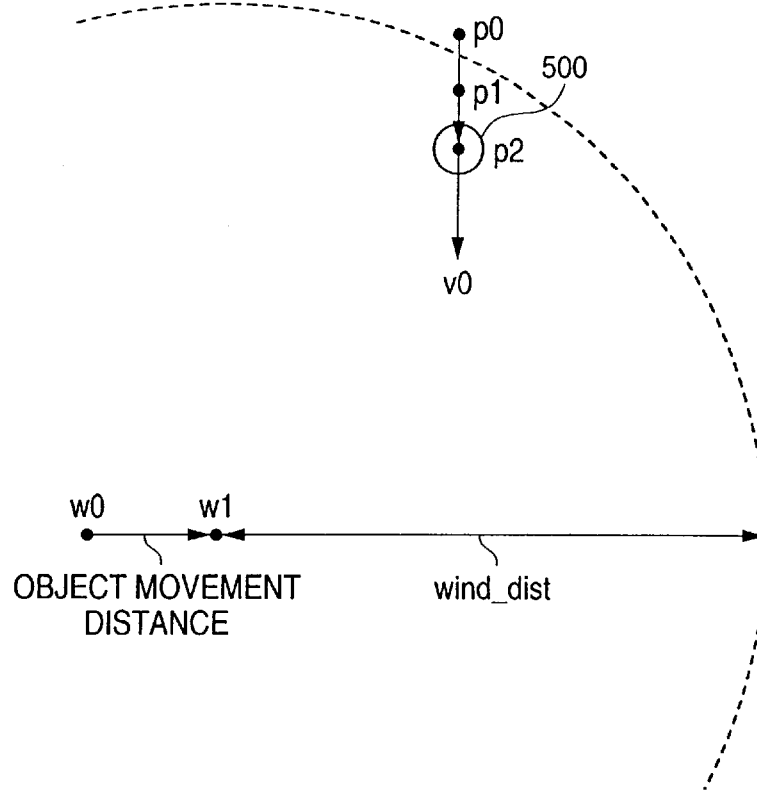

After the current frame number "prtcl_windanimfrm" is incremented by 1 at step S57, at step S59 position p2 at which to display the particle object 500 is determined. At step S59, position p2 at which to display the particle object 500 is calculated by using the direction "prtcl_winddir" (=v0=prtcl_windnowdir) of the currently influenced virtual wind and the force "prtcl_windpow" from the influential virtual wind that initially varies depending on the distance between the reference position w1 of the virtual wind and the position p1 of the particle object 500. The force "prtcl_windpow" from the influential virtual wind is calculated according to Equation (3); for the sake of simplicity, it is assumed in this example that wind_pow=1. In this case, as shown in FIG. 15, position p2 where to display the particle object 500 becomes a position that is on vector v0 and close to the start point of vector v0. This position is obtained from the portion (1.0−(distance from wind)/wind_dist) of Equation (3).

Position p2 of the particle object 500 in the first display frame has thus been determined. Step S61 (weakening of the force received from the influential virtual wind) in FIG. 12 is executed for the next frame, and step S63 is executed for the next particle object (this step can substantially be skipped in this example because only one particle object exists).

Figure 16:
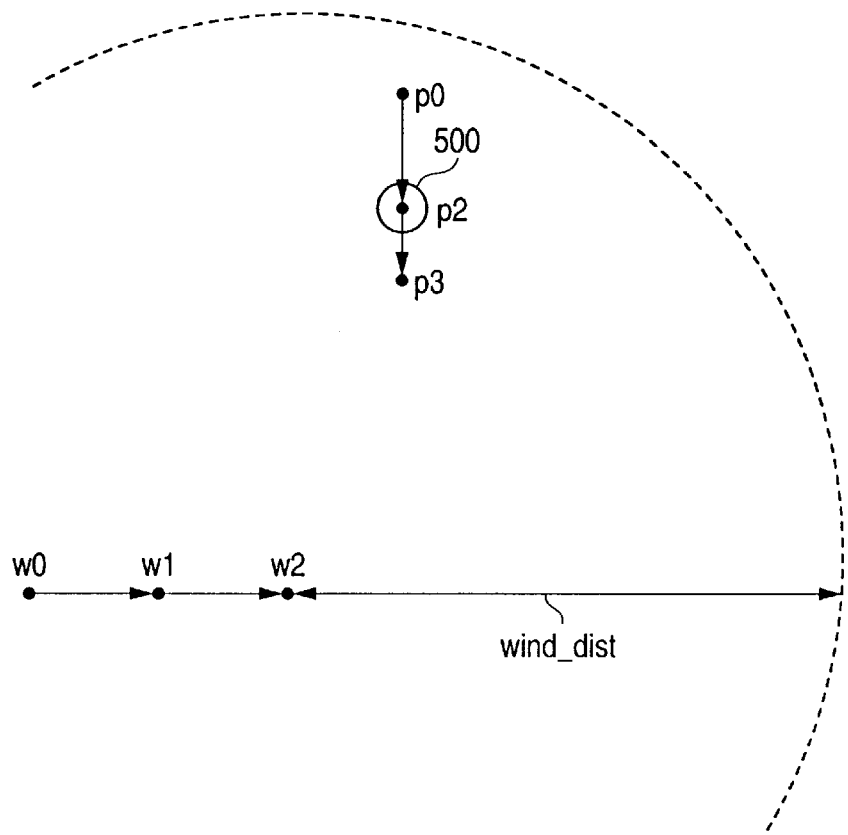
Figure 17:
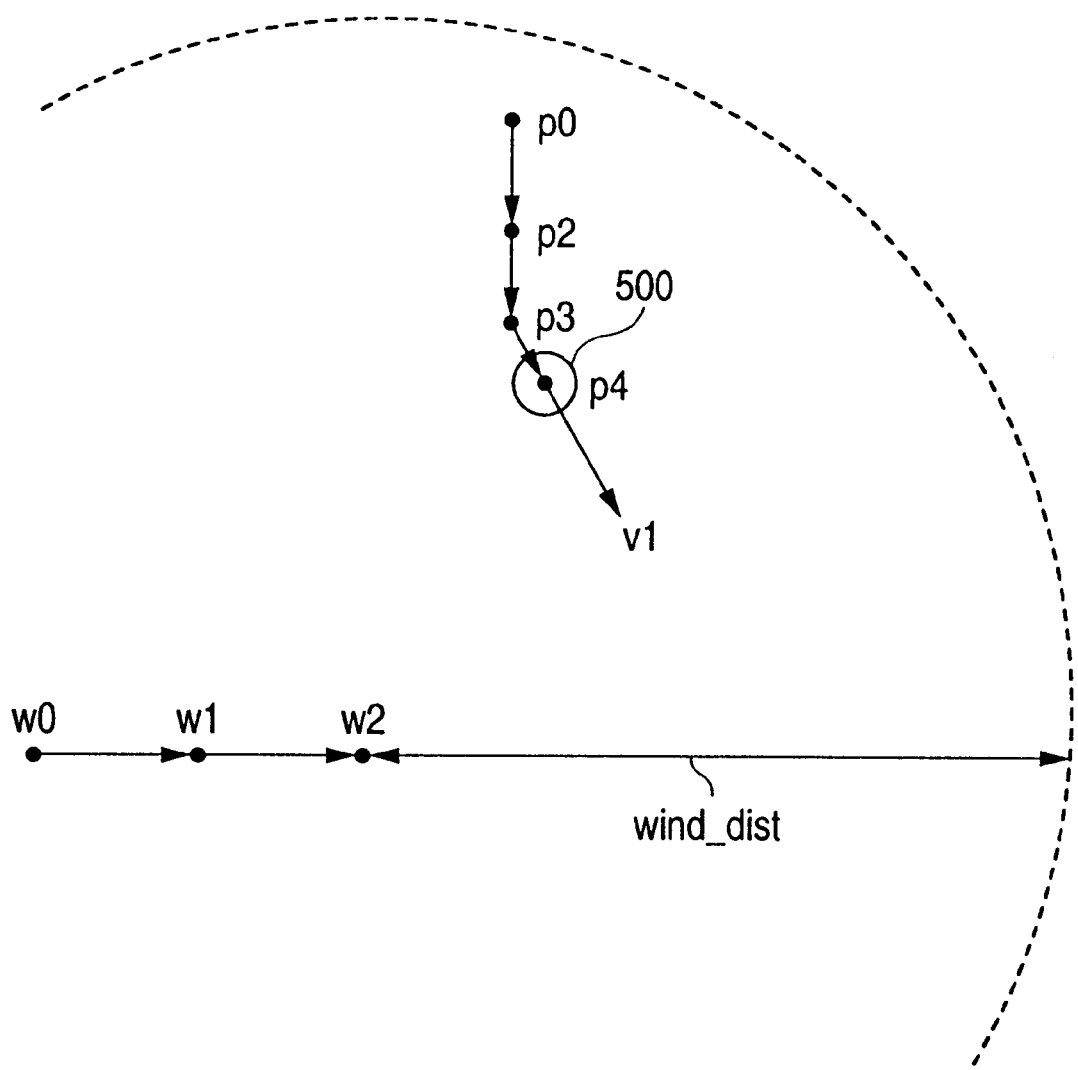

A process for the second display frame will be described with reference to FIGS. 16 and 17. In FIG. 16, the position of the virtual wind has moved from w1 to w2 as the correlated object has moved. The default movement vector and the gravity vector are added to position p2 of the particle object 500, as a result of which the position of the particle object 500 is moved to p3.

The influential range of the virtual wind reaches positions that are distant from position w2 by "wind_dist." Therefore, also in this case it is judged at steps S37–S39 (see FIG. 11) that the particle object 500 is located in the influential range of the virtual wind concerned. The current frame number "prtcl_windanimfrm" is 1 because it was incremented by 1 in the process for the first frame. Since the maximum number "prtcl_windanimfrmmax" of interpolation frames is 3, a transition is made from step S41 to the process part of FIG. 12 via terminal C.

At step S55 in FIG. 12, a calculation similar to the one that was described above with reference to FIG. 14 is performed, whereby vector v1 is obtained in this display frame as a direction "prtcl_winddir" of the influential virtual wind. At step S57, the current frame number "prtcl_windanimfrm" is incremented by 1 to become 2. At step S59, position p4 where to display the particle object 500 is calculated by using the force "prtcl_windpow" from the influential virtual wind that was weakened at step S61 in the preceding display frame and the wind direction "prtcl_winddir" that was calculated at step S55. As shown in FIG. 17, position p4 of the particle object 500 is on vector v1 that was determined at step S55 and is close to the start point of vector v1.

Position p4 of the particle object 500 in the second display frame has thus been determined. The force "prtcl_windpow" is further weakened at step S61 and step S63 can be disregarded in this example.

A process for the third display frame will be described with reference to FIG. 18. In FIG. 18, the position of the virtual wind has moved from w2 to w3 as the correlated object has moved. The default movement vector and the gravity vector are added to position p4 of the particle object 500, as a result of which the position of the particle object 500 is moved to p5.

The influential range of the virtual wind reaches positions that are distant from position w3 by "wind_dist." Therefore, also in this case it is judged at steps S37–S39 (see FIG. 11) that the particle object 500 is located in the influential range of the virtual wind concerned. The current frame number "prtcl_windanimfrm" is 2 because it was incremented by 1 in the process for the second frame. Since the maximum number "prtcl_windanimfrmmax" of interpolation frames is 3, a transition is made from step S41 to the process part of FIG. 12 via terminal C.

At step S55 in FIG. 12, a calculation similar to the one that was described above with reference to FIG. 14 is performed, whereby vector v2 is obtained in this display frame as a direction "prtcl_winddir" of the influential virtual wind. At step S57, the current frame number "prtcl_windanimfrm" is incremented by 1 to become 3. At step S59, position p6 where to display the particle object 500 is calculated by using the force "prtcl_windpow" from the influential virtual wind that was weakened at step S61 in the preceding display frame and the wind direction "prtcl_winddir" that was calculated at step S55. The position p6 of the particle object 500 is on vector v2 that was determined at step S55 and is close to the start point of vector v2. If vectors v1 and v2 have the same length, the distance between p3 and p4 is longer than the distance between p5 and p6. This is because the force "prtcl_windpow" was weakened at step S61 in the preceding frame.

Position p6 of the particle object 500 in the third display frame has thus been determined. The force "prtcl_windpow" is further weakened at step S61 and step S63 can be disregarded in this example.

A process for the fourth display frame is somewhat different from the processes for the first to third display frames. Steps S31–S35 in FIG. 10 are executed in the same manner as in the first to third display frames. However, if it is judged at steps S37 and S39 in FIG. 11 that the particle object 500 is located in the influential range of the closest virtual wind, since prtcl_windanimfrm=prtcl_windanimfrmmax=3 at step S41, a transition is made to step S43 rather than to the process part of FIG. 12 via terminal C. At step S43, the current frame number "prtcl_windanimfrm" is initialized to 0. At step S45, the interpolation end direction "prtcl_windnextdir" is substituted into the interpolation start direction "prtcl_windnowdir." In the example of FIGS. 13–18, as shown in FIG. 19A the new direction "prtcl_windnowdir" is equal to the old direction "prtcl_windnextdir" that is horizontal.

At step S45, a new interpolation end direction "prtcl_windnextdir" is determined. Since the closest virtual wind has been identified at step S37, a new interpolation end direction "prtcl_windnextdir" is determined by using the direction "wind_dir" of the identified virtual wind. However, a new interpolation end direction "prtcl_windnextdir" is determined from a prescribed random range having the direction "wind_dir" at the center instead of employing "wind_dir" itself as "prtcl_windnextdir."

In the example of FIGS. 13–18, since the virtual wind closest to the particle object 500 remains the same also in the fourth display frame, as shown in FIG. 19B a new interpolation end direction "prtcl_windnextdir" is determined from a random range having the direction "wind_dir" (equal to old "prtcl_windnextdir") at the center. In the fourth and later display frames, an interpolation end direction "prtcl_windnextdir" as shown in FIG. 19C is used.

Then, force "prtcl_windpow" to be received from the influential virtual wind is calculated according to Equation (3) for the new closest virtual wind. At step S51, the maximum number "prtcl_windanimfrmmax" of interpolation frames is re-set to a random integer selected from 16–32. Then, a transition is made to the process part of FIG. 12 via terminal B. In the fourth and later display frames, the process described above with reference to FIGS. 13–18 is executed by using new parameters "prtcl_windnowdir," "prtcl_windnextdir," "prtcl_windpow," "prtcl_windanimfrm," and "prtcl_windaimfrmmax."

As described above, in the first embodiment, if an object in a virtual three-dimensional space is moved according to manipulation inputs of a player or a predetermined rule, the influential range of a virtual wind that is correlated with the object is moved. Movement conditions of a particle object representing snow are determined based on the positional relationship between the particle object and the influential range of the virtual wind. That is, if the positional relationship between the particle object and the influential range of the virtual wind varies, the movement conditions of the particle object are changed accordingly. The particle object is moved according to the movement conditions.

When a wind occurs in the real world, the strength of the wind varies from one place to another. As for a wind that is generated by a movement of a moving object (e.g., a train), its position of occurrence moves with time. According to the first embodiment, the movement direction and the movement speed of a particle object representing snow can be changed in accordance with the positional relationship between the particle object and the influential range of a virtual wind. Therefore, a computer is allowed to perform an image display in which a wind whose strength varies from one place to another whirls snow. Further, the influential range of a virtual wind can be moved with time. Therefore, a computer is allowed to perform a display in which snow whirls being influenced by a wind whose position of occurrence moves.

Embodiment 2

The process flow of FIGS. 10–12 according to the first embodiment can be modified in various manners. In the process flow according to the first embodiment, once the closest virtual wind is found, steps S55–S63 are repeatedly executed until the current frame number "prtcl_windanimfrm" reaches the maximum number "prtcl_windanimfrmmax" of interpolation frames even if another virtual wind comes closest to the particle object. As described below, another process flow is possible in which if another virtual wind comes closest to the particle object in the second or later interpolation operation, it may be employed as a new closest virtual wind that influences the particle object.

A process flow according to the second embodiment will be described below. The main flow of the second embodiment is the same as that of the first embodiment in a sense as shown in FIG. 8. First, an object movement process is executed at step S1. For example, a movement distance of the object is calculated according to manipulations on the key-pad 161 or instructions from the program and a position of the object is determined. At step S3, a particle objects movement process is executed, which will be described later in detail.

At step S5, a process of excluding particle objects that have contacted the object from the subjects of processing is executed. If it is judged that a particle object has contacted the object, the particle object is removed from the subjects of processing and the data of the particle object are deleted from the particle data table 300.

Then, an object drawing process is executed at step S7. A light source calculation and transparent transformation are performed on the object and results are written to the frame buffer 112. A particle objects drawing process is executed at step S9. A light source calculation and transparent transformation are performed on particle objects and results are written to the frame buffer 112. The contents of the frame buffer 112 are displayed at step 10.

At step S11, it is judged whether the game should be finished. Whether to finish the game is judged based on, for example, whether the user has commanded the end of the game by manipulating the key-pad 161 or the game completion conditions in the story of the game have been satisfied. If the game should not be finished, the process is returned to step S1. If the game should be finished, the process is finished.

Next, the particle objects movement process will be described with reference to FIGS. 10, 12, and 20. First, since the object movement process has been executed at step S1 (see FIG. 8), at step S23 an object movement vector is acquired based on the object positions in the preceding frame and the current frame. At step S25, to move the positions of virtual winds, the object movement vector is added to the reference positions "wind_pos" of the virtual winds.

At step S27, the value of a counter s for particle objects is initialized to 1. At step S29, it is judged whether the value of the counter s has exceeded the number n of particle objects. If all the particle objects have been subjected to the process, the process is finished. On the other hand, if not all particle objects have been subjected to the process, at step S31 a default movement vector of the sth particle object is calculated according to prtcl_dir (default movement direction of the particle object)×prtcl_pow (default movement distance of the particle object).

At step S33, the movement vector is added to the position "prtcl_pos" of the particle object. Where gravity exists, at step S35 a gravity vector is added to the position "prtcl_pos" of the particle object. The process goes to the process part shown in FIG. 20 via terminal A.

Figure 20:
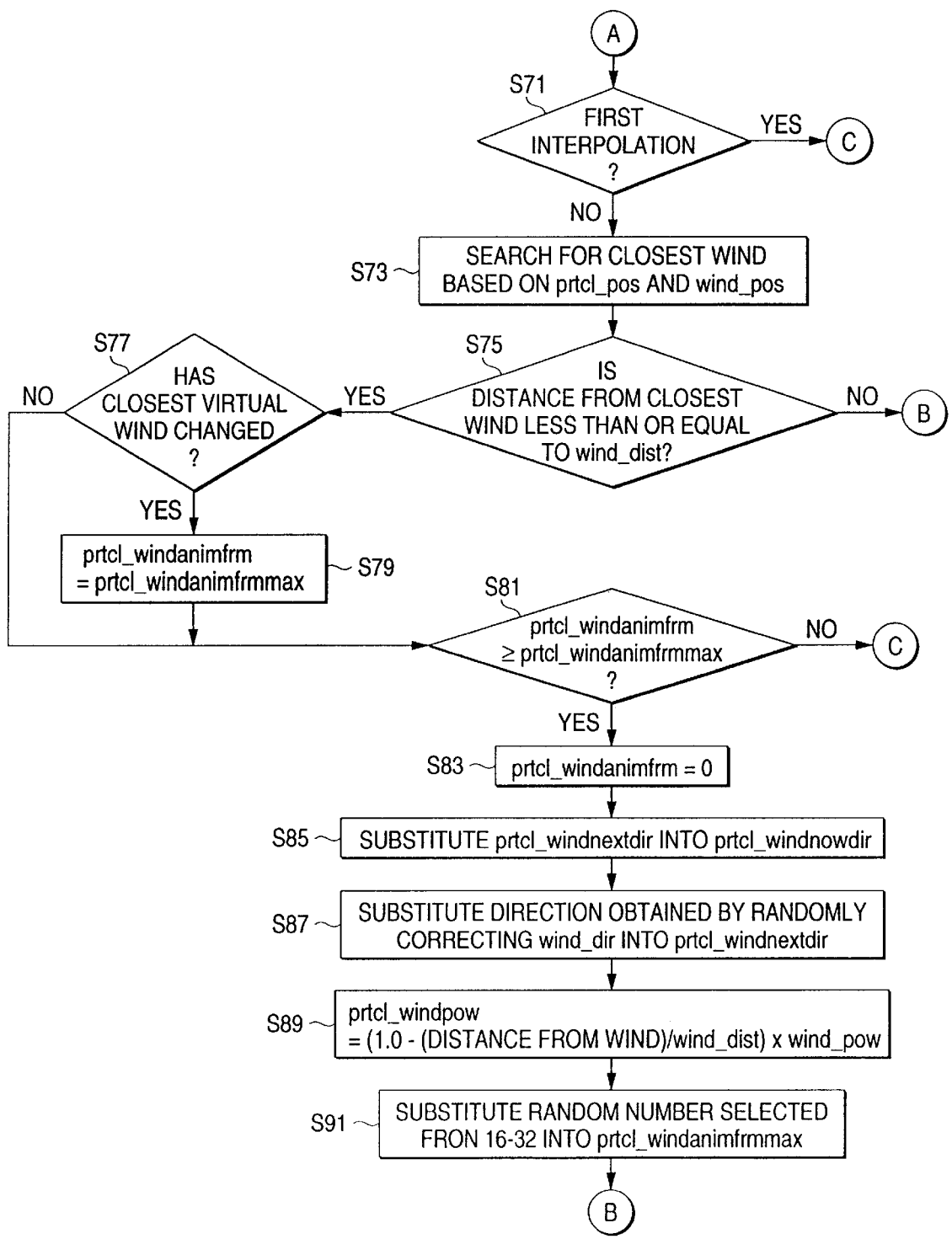
FIG. 20 is a flowchart showing a second part of the particle objects movement process according to the second embodiment.

In the process part of FIG. 20, it is judged at step S71 whether a first interpolation operation is being performed. The term "a first interpolation operation is being performed" means a state that step S55 in FIG. 12 has been executed at least once and the current frame number "prtcl_windanimfrm" has not reached the maximum number "prtcl_windanimfrmmax" of interpolation frames even once. Therefore, in the first processing in which step S55 has not been executed even once, a transition is made to step S73. At step S73, the closest virtual wind is searched for based on the position "prtcl_pos" of the particle object and the reference positions of the virtual winds. At step S37, for example, the distance between the position of the particle object and the reference position of each virtual wind is calculated in order and the smallest distance value and the number of a virtual wind having the smallest distance value are held. In this manner, the closest virtual wind can be found when step S37 has been executed for all the virtual winds.

At step S75, it is judged whether the distance from the closest virtual wind is less than or equal to its influential range "wind_dist." If the particle object being processed is not included in the influential range of the closest virtual wind, a transition is made to the process part of FIG. 12 via terminal B. On the other hand, if the particle object being processed is included in the influential range of the closest virtual wind, it is judged at step S77 whether the closest virtual wind has changed to another virtual wind. If the closest, influential virtual wind has changed to another virtual wind, to perform the interpolation at step S55 by using the new closest, influential virtual wind, at step S79 the current frame number "prtcl_windanimfrm" is regarded as having reached the maximum number "prtcl_windanimfrmmax" of interpolation frames. On the other hand, if the closest, influential virtual wind remains the same, a transition is made to step S81. It is judged that the closest, influential virtual wind remains the same also when the particle object has first entered the influential range of a virtual wind.

After execution of step S77 or S79, it is judged at step S81 whether the current frame number "prtcl_windanimfrm" is greater than or equal to the maximum number "prtcl_windanimfrmmax" of interpolation frames. If "prtcl_windanimfrm" is less than "prtcl_windanimfrmmax," a transition is made to the process part of FIG. 12 via terminal C. In the case where step S55 has not been executed even once, naturally the current frame number "prtcl_windanimfrm" has not reached the maximum number "prtcl_windanimfrmmax" of interpolation frames yet. Therefore, the process part of FIG. 12 will be described first.

After the transition to the process part of FIG. 12 via terminal B, first, it is judged at step S53 whether the interpolation of step S55 has been performed even once. For example, if the particle object is not located in the influential range of the closest virtual wind in the first processing, step S55 (interpolation) should have not been executed even once. In such a case, at step S54 the value of the counter s for particle objects is incremented by 1 and the process returns to step S29 in FIG. 10 via terminal D.

On the other hand, if the interpolation has been executed even once or if the current frame number "prtcl_windanimfrm" is less than the maximum number "prtcl_windanimfrmmax" of interpolation frames (transition via terminal C), at step S55 a current wind direction "prtcl_winddir" that influences the particle object concerned is calculated according to Equation (1). Equation (1) means that interpolation is performed from an interpolation start direction "prtcl_windnowdir" to an interpolation end direction "prtcl_windnextdir" over the maximum number "prtcl_windanimfrmmax" of interpolation frames. The initial value of "prtcl_windnowdir" is the default movement direction "prtcl_dir" of the particle object and the initial value of "prtcl_windnextdir" is the direction "wind_dir" of the influential virtual wind.

Then, at step S57, the current frame number "prtcl_windanimfrm" is incremented by 1. At step S59, the position "prtcl_pos" of the particle object is changed. The position "prtcl_pos" of the particle object is calculated according to Equation (2).

The initial value of force "prtcl_windpow" that is received from the influential virtual wind is calculated according to Equation (3). Equation (3) means that the force "prtcl_windpow" received from the influential virtual wind decreases in proportion to the distance from the reference position of the virtual wind.

The force "prtcl_windpow" received from the influential virtual wind, which is used in calculating the position of the particle object, is weakened as the frame proceeds. That is, at step S61, "prtcl_windpow" is multiplied by 0.99 for the next calculation. However, 0.99 is just an example and another value smaller than 1 may be used.

At step S63, the value of the counter s for particle objects is incremented by 1 to make a transition to processing of another particle object. The process returns to step S29 in FIG. 10 via terminal D.

As described above, steps S55–S63 are repeatedly executed until for the same particle object it is judged at step S81 in FIG. 11 that the current frame number "prtcl_windanimfrm" has reached the maximum number "prtcl_windanimfrmmax" of interpolation frames.

If it is judged that the first interpolation operation has finished, that is, if "prtcl_windanimfrm" has reached "prtcl_windanimfrmmax," the process goes from step S71 to step S73, where the closest virtual wind is again searched for. If the particle object is out of the influential range of the closest virtual wind, a transition is made to the process part of FIG. 12 via terminal B.

On the other hand, if the particle object is located in the influential range of the closest virtual wind, it is judged at step S77 that the closest, influential virtual wind has changed. Since the reference positions of the virtual winds and the particle objects move, there is a possibility that the closest, influential virtual wind has changed. If the closest, influential virtual wind has changed, setting is so made at step S79 that the current frame number "prtcl_windanimfrm" has reached the maximum number "prtcl_windanimfrmmax" of interpolation frames. If the closest, influential virtual wind remains the same, a transition is made to step S81.

At step S81, it is judged whether prtcl_windanimfrm≧prtcl_windanimfrmmax is satisfied. If it is judged at step S81 that prtcl_windanimfrm ≧prtcl_windanimfrmmax is satisfied, at step S83 the current frame number "prtcl_windanimfrm" is reset to 0. At step S85, the interpolation end direction "prtcl_windnextdir" so far used is substituted into the interpolation start direction "prtcl_windnowdir." At step S87, a direction obtained by randomly changing the direction "wind_dir" of the closest virtual wind into the interpolation end direction "prtcl_windnextdir."

At step S89, force "prtcl_windpow" received from the influential virtual wind is calculated again according to the above Equation (3). At step S91, a random integer selected from 16–32, for example, is substituted into the maximum number "prtcl_windanimfrmmax" of interpolation frames. Then, a transition is made to the process part of FIG. 12 via terminal B and the process part of FIG. 12 is executed under the new conditions that have been set at steps S83–S91.

As for the example of FIGS. 13–19, the same operations are performed in the second embodiment as in the first embodiment. However, where a plurality of virtual winds exist, there is a possibility that the interpolation start direction "prtcl_windnowdir" and the interpolation end direction "prtcl_windnextdir" are changed frequently after the current frame number "prtcl_windanimfrm" has first reached the maximum number "prtcl_windanimfrmmax" of interpolation frames.

As described above, in the this embodiment, the influential ranges of virtual winds in a virtual three-dimensional space are moved with a movement of an object that is correlated with the virtual winds in advance (steps S23 and S25) and it is judged based on the moved influential ranges of the virtual winds whether each particle object is influenced by the virtual winds (steps S37 and S39). The position of the particle object for which ajudgement has been made that it is influenced by a virtual wind is determined in accordance with the direction of the influential virtual wind (steps S55 and S59). The particle object so judged is displayed at the determined position (step S10).

With the above process, the virtual winds are moved as the object moves and particle objects for which a judgment has been made that they are influenced by virtual winds are moved in accordance with the directions of the influential virtual winds. Therefore, particle objects are displayed on the screen as if winds were generated by a movement of the object. This enables an expression that is closer to a counterpart in the read world.

The position of a particle object for which a judgment has been made that it is influenced by a virtual wind is determined in accordance with the direction and the strength of the influential virtual wind or determined in consideration of gravity. This makes it possible to express both a strong wind and a weak wind. Further, for example, this makes it possible to display, on the screen, a scene that snow whirls and finally falls to the ground. A mode of operation is possible in which the strength of a virtual wind is correlated with the movement speed or the like of a correlated object.

The position of a particle object for which a judgment has been made that it is influenced by a virtual wind may be determined in accordance with the direction of the influential virtual wind and its strength that depends on the distance between its reference position and the particle object in the manner given by Equation (3). This makes it possible to express, on the screen, not only the strength of a virtual wind but also, for example, a state that a particle object that is distant from the reference position of a virtual wind is not much influenced by the virtual wind.

In determining the position of a particle object for which a judgment has been made that it is influenced by a virtual wind, the strength of the virtual wind that depends on the distance between its reference position and the particle object may be weakened as the display frame proceeds or the maximum number of interpolation frames may be determined randomly. This makes it possible to express more realistically the way snow as an example of particle objects falls while fluttering.

Further, the position of a particle object for which a judgment has been made that it is influenced by a virtual wind may be determined by interpolating the direction of the influential virtual wind and the direction of force that the particle object received previously over a prescribed number of display frames in the manner given by Equation (1) and determining the position of the particle object in accordance with the directions obtained by the interpolation. In this case, the manner of whirling of snow as an example of particle objects varies in a subtle manner, which makes it possible to generate a more realistic image.

Other Embodiments (1) Although it is judged at the beginning (step S53) of the process of FIG. 12 whether interpolation has been performed even once, this judgment may be omitted. For example, when a particle object is not influenced by any virtual wind, the force "prtcl_windpow" received from the influential virtual wind may be set at 0. Alternatively, this parameter may be set at 0 if the calculation result of Equation (3) is a negative value. Although the current frame number "prtcl_windfrm," the wind direction "prtcl_winddir," etc. are changed, this causes no problems because the particle object is not moved being influenced by any virtual wind.

(2) Interchanging step S7 and step S9 in FIG. 10 causes no change in display contents.

(3) Although the first and second embodiments assume the presence of gravity, it is possible to assume a state without gravity. For example, in the case of objects of smoke, they go up rather than go down according to gravity.

(4) The configuration of FIG. 1 is just an example and various modifications are possible. The use of the communications interface 115 is optional. Since the invention does not directly relate to sound processing, the sound processing section 109 need not always be provided.

The CD-ROM 131 is just an example recording medium and may be replaced by any of other various recording media including an internal memory such as a ROM, a DVD-ROM, a memory cartridge, a floppy disk, a magnetic disk, and a DVD-RAM. When another type of recording medium is used, it is necessary to replace the CD-ROM drive 113 with a drive capable of reading out information from the corresponding medium.

Further, although the above description is directed to the case where the invention is implemented by a computer program, the invention can be implemented by a combination of a computer program and dedicated devices such as electronic circuits or by only dedicated devices such as electronic circuits.

Although the invention has been described above in detail by using the embodiments, the invention is not limited to those embodiments and can be modified in a desired manner without departing from the spirit and scope of the invention. For example, although the above embodiments are directed to the case where the invention is implemented by using a home game machine as a platform, the invention may be implemented by using an ordinary computer, an arcade game machine or the like as a platform. It is also conceivable to implement the invention by using a personal digital assistant, a car navigation system, or the like as a platform.

The manner of providing a program and data to implement the invention is not limited to the use of a recording medium such as a CD-ROM that is removably mounted in a computer or a game machine. That is, a program and data to implement the invention may be recorded in the memory of another apparatus on the network 151 that is connected to the home game machine 101 via the communications interface 151 and the communications channel 141 and may be used after being stored in the RAM 105 sequentially when necessary.

Display Example

Figure 21:
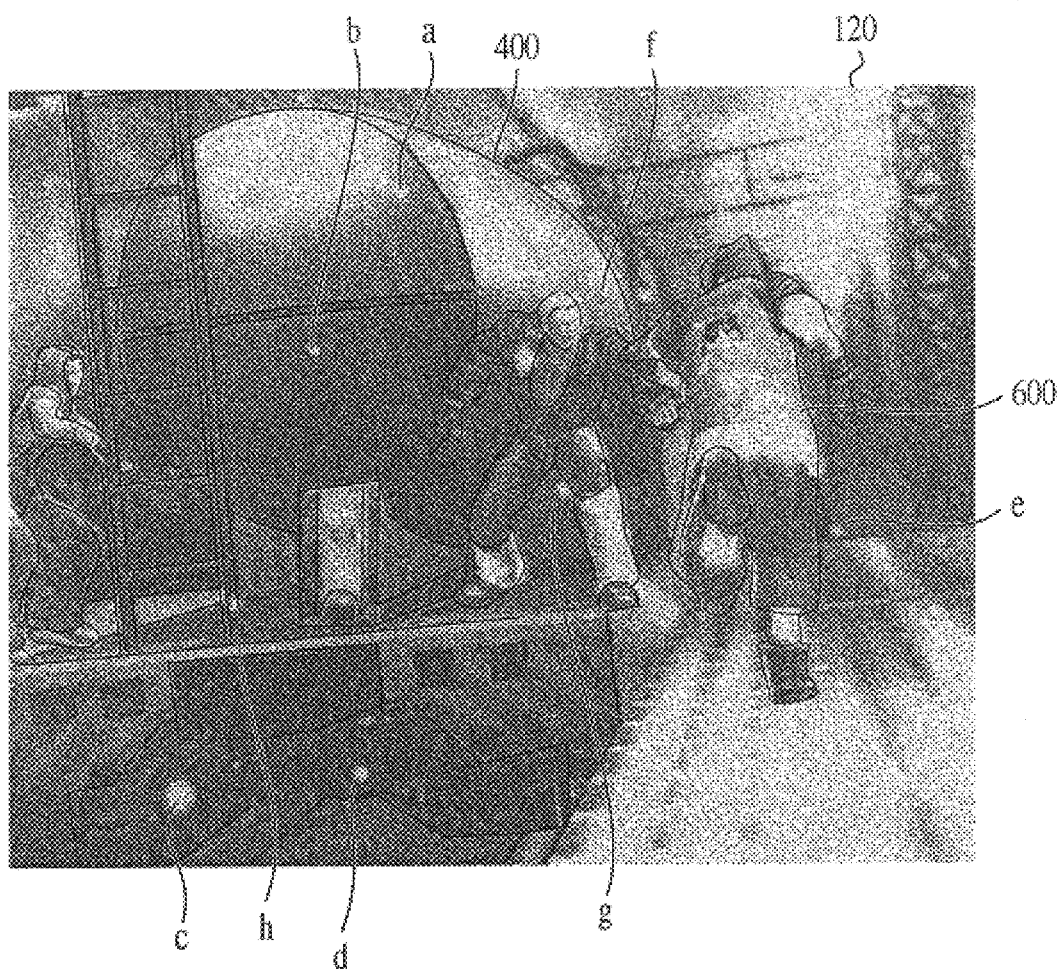
FIG. 21 shows an example display picture that is obtained when the invention is used.

FIG. 21 shows a display example in which snow as particle objects is caused to fall according to the invention. Snow particles a–h, which are indicated by arrows to make them easier to find, are influenced by virtual winds that are generated as a train 400 as an object moves toward the deep side on the paper. A character 600 is running after the train 400. It is also possible to define virtual winds for the character 600 and make such setting that those virtual winds also influence the movements of snow particles.

As described above, the invention makes it possible to express the behavior of other objects more realistically that is influenced by winds that are caused by the movement of an object.

The present disclosure relates to subject matter contained in priority Japanese Patent Application No. 2000-123955, filed on Apr. 25, 2000, the contents of which is herein expressly incorporated by reference in its entirety.

What is claimed is:

1. A computer-readable recording medium in which a game program processes an object movement in a virtual three-dimensional space, the game program causing a computer to execute the steps of:
    moving at least one region having prescribed sizes on a screen in correlation with a moving object, which is moved according to a prescribed rule or a manipulation of a player, each region being correlated with the moving object so that a relative position between each region and the moving object remains fixed as the object and region move;
    displaying at least one particle object on the screen and judging a positional relationship between the particle object and the region having the prescribed size;
    determining a condition of movement on the screen of the particle object in accordance with a variation in the positional relationship between the particle object and the region having the prescribed size; and
    moving the particle object on the screen in accordance with the determined movement conditions.

2. The recording medium according to claim 1, wherein the positional relationship is judged based on a distance between a reference point of the region having the prescribed size and a reference point of the particle object.

3. The recording medium according to claim 2, wherein where a plurality of regions having prescribed sizes exist, the positional relationship is judged based on a distance between the particle object and one of the plurality of regions that is closest to the particle object.

4. The recording medium according to claim 3, wherein where a plurality of particle objects exist, the positional relationship is judged for each of the particle objects.

5. The recording medium according to claim 1, wherein the movement conditions are determined in such a manner as to be updated in accordance with the variation in the positional relationship.

6. The recording medium according to claim 5, wherein the movement conditions are determined so as to be changed for each position in the region having the prescribed size.

7. The recording medium according to claim 5, wherein the movement conditions are calculated every time the positional relationship is updated.

8. The recording medium according to claim 5, wherein the movement conditions are updated in each frame processing.

9. The recording medium according to claim 5, wherein the movement conditions are such that a movement speed is changed in accordance with a distance between the region having the prescribed size and the particle object.

10. The recording medium according to claim 1, wherein the movement conditions are stored in advance.

11. A method for processing an object movement in a virtual three-dimensional space, comprising:
    moving at least one region having prescribed sizes on a screen in correlation with a moving object, which is moved according to a prescribed rule or a manipulation of a player, each region being correlated with the moving object so that a relative position between each region and the moving object remains fixed as the object and region move;
    displaying at least one particle object on the screen and judging a positional relationship between the particle object and the region having the prescribed size;
    determining a condition of movement on the screen of the particle object in accordance with a variation in the positional relationship between the particle object and the region having the prescribed size; and
    moving the particle object on the screen in accordance with the determined movement condition.

12. The method according to claim 11, wherein the positional relationship is judged based on a distance between a reference point of the region having the prescribed size and a reference point of the particle object.

13. The method according to claim 12, wherein where a plurality of regions having prescribed sizes exist, the positional relationship is judged based on a distance between the particle object and one of the plurality of regions that is closest to the particle object.

14. The method according to claim 13, wherein where a plurality of particle objects exist, the positional relationship is judged for each of the particle objects.

15. The method according to claim 11, wherein the movement condition is determined in such a manner as to be updated in accordance with the variation in the positional relationship.

16. The method according to claim 15, wherein the movement condition is determined so as to be changed for each position in the region having the prescribed size.

17. The method according to claim 15, wherein the movement condition is calculated every time the positional relationship is updated.

18. The method according to claim 15, wherein the movement condition is updated in each frame processing.

19. The method according to claim 15, wherein the movement condition is such that a movement speed is changed in accordance with a distance between the region having the prescribed size and the particle object.

20. The method according to claim 11, wherein the movement condition is stored in advance.

21. A game machine which controls, on a display screen, an object movement that is processed in a virtual three-dimensional space, comprising:

a unit for running a game according to a program;

a memory for storing at least part of the program;

the display screen on which to display the game that is run by the unit, wherein the unit executes, according to the program stored in the memory, the steps of:

moving at least one region having prescribed sizes on the display screen in correlation with a moving object, which is moved according to a prescribed rule or a manipulation of a player, each region being correlated with the moving object so that a relative position between each region and the moving object remains fixed as the object and region move;

displaying at least one particle object on the display screen and judging a positional relationship between the particle object and the region having the prescribed size;

determining a condition of movement on the display screen of the particle object in accordance with a variation in the positional relationship between the particle object and the region having the prescribed size; and moving the particle object on the display screen in accordance with the determined movement condition.

22. The game machine according to claim 21, wherein the unit judges the positional relationship based on a distance between a reference point of the region having the prescribed size and a reference point of the particle object.

23. The game machine according to claim 22, wherein where a plurality of regions having prescribed sizes exist, the unit judges the positional relationship based on a distance between the particle object and one of the plurality of regions that is closest to the particle object.

24. The game machine according to claim 23, wherein where a plurality of particle objects exist, the unit judges the positional relationship for each of the particle objects.

* * * * *

UNITED STATES PATENT AND TRADEMARK OFFICE
CERTIFICATE OF CORRECTION

PATENT NO.     : 6,508,708 B1
DATED          : January 21, 2003
INVENTOR(S)    : S. Okubo It is certified that error appears in the above-identified patent and that said Letters Patent is hereby corrected as shown below:

<u>Title page,</u>
Item [56], References Cited, the following OTHER PUBLICATION was omitted and should be included:
-- "Human Behavior Simulation for CG Animation," by UNUMA et al.,
PIXEL, No. 125, Graphics Processing Information Center, published on February 1, 1993, pages 96-97, together with an English language translation of the same. --

Signed and Sealed this

Fourteenth Day of October, 2003

JAMES E. ROGAN
*Director of the United States Patent and Trademark Office*